US012676723B2

(12) United States Patent
 Barros et al.

(10) Patent No.: US 12,676,723 B2
(45) Date of Patent: *Jul. 7, 2026

(54) JOINT CONNECTED ISOCHRONOUS STREAM COMMUNICATION WITH CROSS ACKNOWLEDGEMENT

(71) Applicant: Google LLC, Mountain View, CA (US)

(72) Inventors: Daniel Barros, Sra da Hora (PT); Sunil Kumar, Cupertino, CA (US)

(73) Assignee: GOOGLE LLC, Mountain View, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 18/218,253

(22) Filed: Jul. 5, 2023

(65) Prior Publication Data

US 2024/0121064 A1     Apr. 11, 2024

Related U.S. Application Data

(60) Provisional application No. 63/440,047, filed on Jan. 19, 2023, provisional application No. 63/439,300, filed on Jan. 17, 2023, provisional application No. 63/414,276, filed on Oct. 7, 2022.

(51) Int. Cl.
 *H04L 5/00* (2006.01)
 *H04W 76/15* (2018.01)
 *H04W 12/03* (2021.01)
(52) U.S. Cl.
 CPC .......... *H04L 5/0055* (2013.01); *H04W 76/15* (2018.02); *H04W 12/03* (2021.01)

(58) Field of Classification Search
 CPC .... H04L 5/0055; H04W 76/15; H04W 12/03; H04R 1/1041; H04R 2420/07; H04R 2460/03; H04R 1/1016
 See application file for complete search history.

(56) References Cited

U.S. PATENT DOCUMENTS

| | | | |
|---|---|---|---|
| 2018/0084456 A1 | 3/2018 | Gostev et al. | |
| 2021/0235528 A1* | 7/2021 | Morris | .................... H04W 4/70 |
| 2022/0039041 A1 | 2/2022 | Zhu | |
| 2022/0124471 A1 | 4/2022 | Chen | |
| 2022/0124553 A1* | 4/2022 | Chen | ........................ H04L 1/203 |
| 2022/0239413 A1 | 7/2022 | Hsieh | |
| 2023/0054769 A1* | 2/2023 | Solum | ................. H04L 65/1101 |
| 2024/0032122 A1* | 1/2024 | Campbell | ............. H04W 76/15 |
| 2025/0227133 A1* | 7/2025 | Yoon | ....................... H04W 4/80 |

OTHER PUBLICATIONS

International Preliminary Report on Patentability for Application No. PCT/US2023/031470, mailed Apr. 17, 2025, 9 pages.

* cited by examiner

*Primary Examiner* — Sudesh M. Patidar

(74) *Attorney, Agent, or Firm* — DORITY & MANNING P.A.

(57)     ABSTRACT

Various arrangements for short-range wireless communication are presented herein. An earbud of a pair of true wireless earbuds can receive an audio packet addressed to the other earbud of the pair. A single connected isochronous stream (CIS) within a connected isochronous group (CIG) may be present between the pair of true wireless earbuds and an audio source which transmitted the audio packet. The earbud can transmit a cross-acknowledgement indicating receipt of the audio packet to the other earbud. The earbud can also transmit audio data from the audio packet to the other earbud after the cross acknowledgement.

15 Claims, 15 Drawing Sheets

100

110-1          110-2

121          122          131          132

Bluetooth Audio
Source
130

120

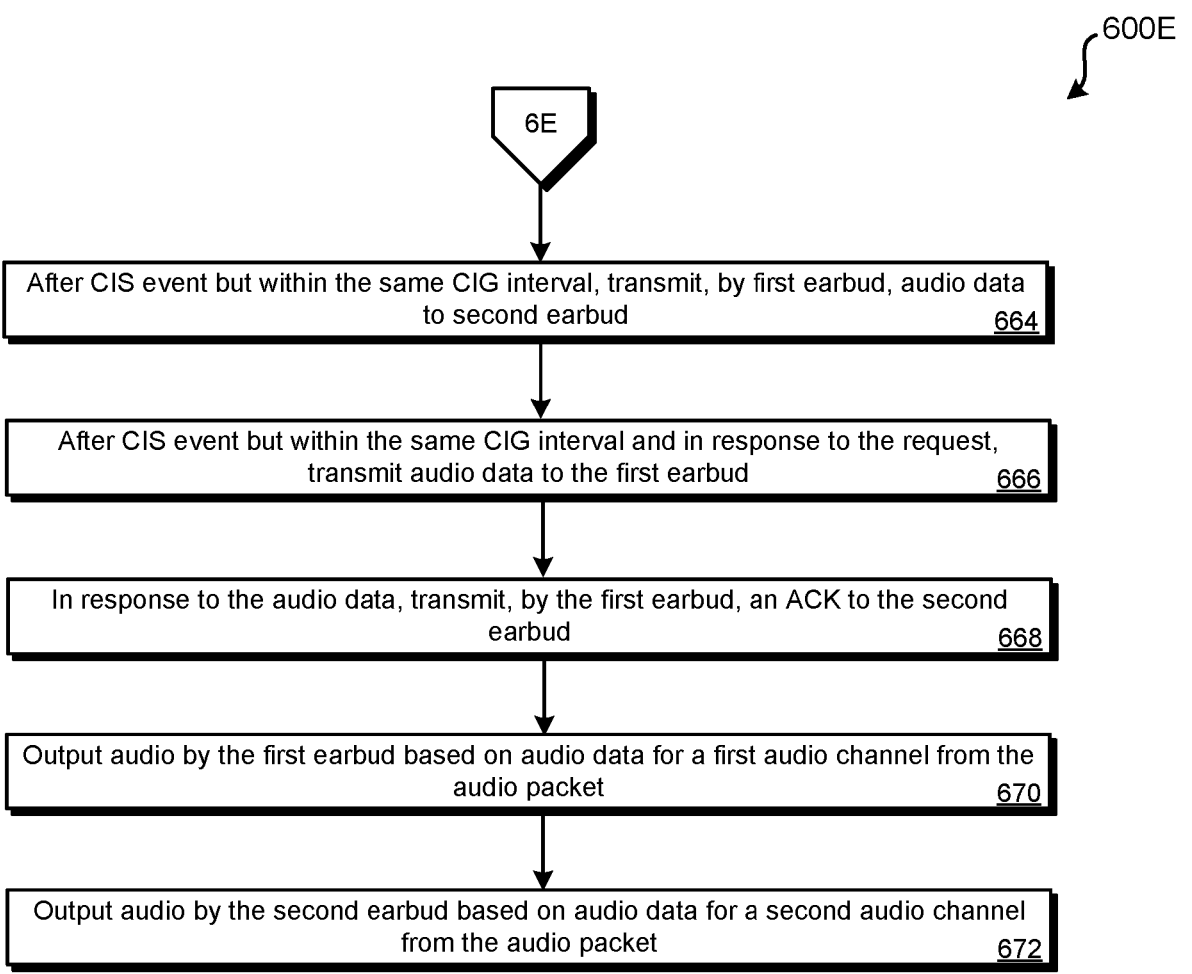

600E

```
        6E
```

After CIS event but within the same CIG interval, transmit, by first earbud, audio data
to second earbud                                                                    664

After CIS event but within the same CIG interval and in response to the request,
transmit audio data to the first earbud                                              666

In response to the audio data, transmit, by the first earbud, an ACK to the second
earbud                                                                                668

Output audio by the first earbud based on audio data for a first audio channel from the
audio packet                                                                          670

Output audio by the second earbud based on audio data for a second audio channel
from the audio packet                                                                 672

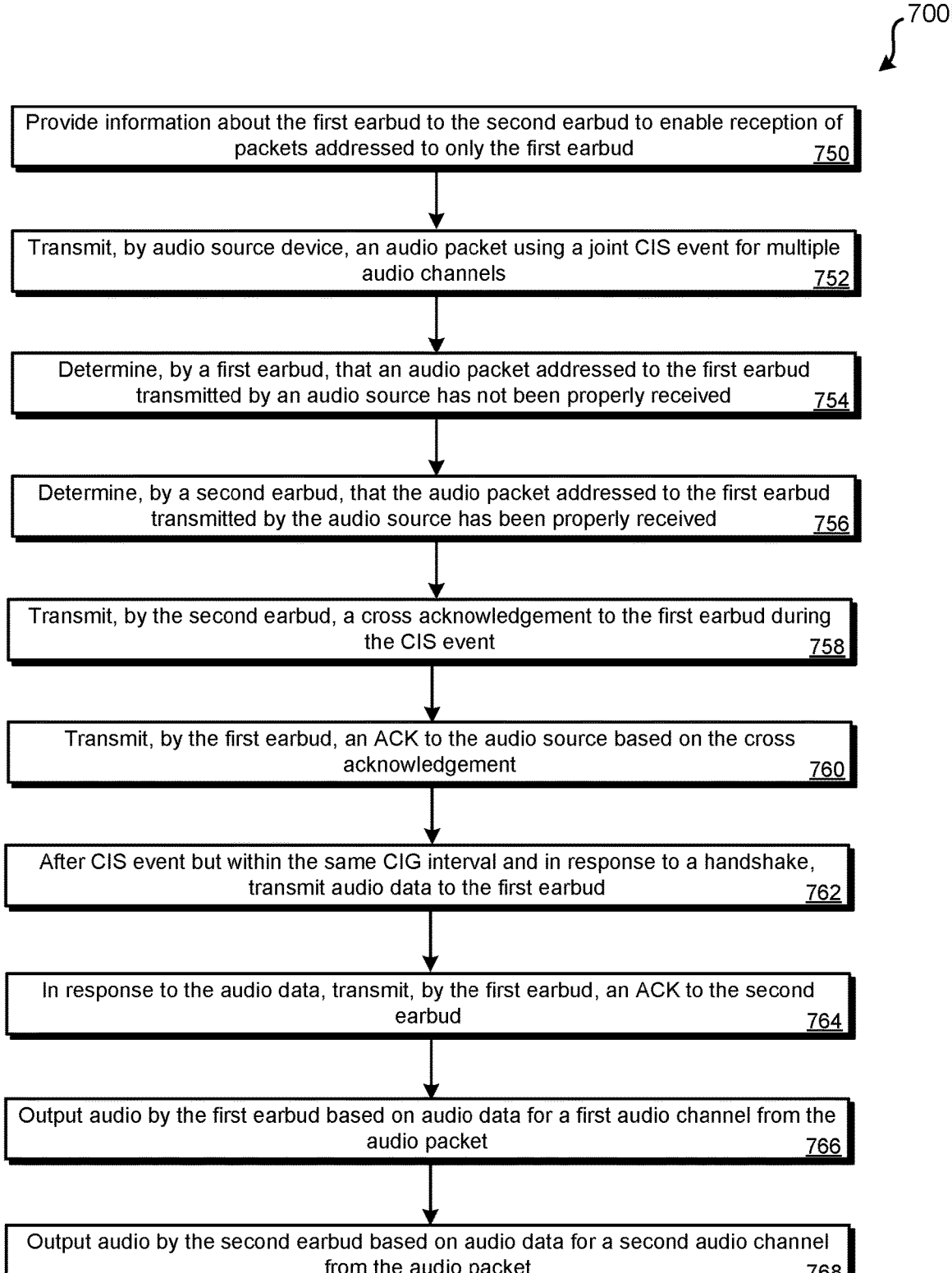

Provide information about the first earbud to the second earbud to enable reception of packets addressed to only the first earbud     750

Transmit, by audio source device, an audio packet using a joint CIS event for multiple audio channels     752

Determine, by a first earbud, that an audio packet addressed to the first earbud transmitted by an audio source has not been properly received     754

Determine, by a second earbud, that the audio packet addressed to the first earbud transmitted by the audio source has been properly received     756

Transmit, by the second earbud, a cross acknowledgement to the first earbud during the CIS event     758

Transmit, by the first earbud, an ACK to the audio source based on the cross acknowledgement     760

After CIS event but within the same CIG interval and in response to a handshake, transmit audio data to the first earbud     762

In response to the audio data, transmit, by the first earbud, an ACK to the second earbud     764

Output audio by the first earbud based on audio data for a first audio channel from the audio packet     766

Output audio by the second earbud based on audio data for a second audio channel from the audio packet     768

FIG. 7D

JOINT CONNECTED ISOCHRONOUS STREAM COMMUNICATION WITH CROSS ACKNOWLEDGEMENT

CROSS-REFERENCES TO RELATED APPLICATIONS

This application claims priority to, and the benefit of U.S. Provisional Patent Application No. 63/414,276, filed Oct. 7, 2022, U.S. Provisional Patent Application No. 63/439,300, filed Jan. 17, 2023, and U.S. Provisional Patent Application No. 63/440,047, filed Jan. 19, 2023, the entire disclosures of which are incorporated by reference in their entirety.

BACKGROUND

Near range wireless communications, such as using a Bluetooth communication protocol, between devices continues to grow in popularity and permeate society. Users demand a high-quality user experience, which can involve uninterrupted audio streams and the ability to communicate with multiple wireless devices simultaneously. One of the major challenges to enable new use cases is the available communication bandwidth and managing packet loss such that audio does not cut out and disrupt the listening experience for a user.

SUMMARY

Various embodiments are described related to a pair of true wireless earbuds. In some embodiments, a pair of true wireless earbuds is described. The device may include a first earbud, comprising a first speaker, a first processing system, and a first wireless communication interface, that may communicate with an audio source device using Bluetooth communications. The device may include a second earbud, comprising a second speaker, a second processing system, and a second wireless communication interface, that may communicate with the audio source device using Bluetooth communications. The second earbud may not be physically connected with the first earbud. The second earbud may be configured to receive an audio packet addressed to only the first earbud. A single connected isochronous stream (CIS) within a connected isochronous group (CIG) may be present between the pair of true wireless earbuds and the audio source device. The second earbud may be configured to transmit a cross-acknowledgement indicating receipt of the audio packet to the first earbud. The second earbud may be configured to transmit audio data from the audio packet to the first earbud.

Embodiments of such a device may include one or more of the following features: the first processing system of the first earbud may be configured to determine that the audio packet was not successfully received by the first earbud. The first processing system of the first earbud may be configured to receive the cross-acknowledgement from the second earbud. The first processing system of the first earbud may be configured to transmit an acknowledgement to the audio source device based on the cross-acknowledgement despite the first earbud determining that the audio packet was not successfully received by the first earbud. The first processing system of the first earbud may be configured to transmit a request directly to the second earbud for the audio data from the audio packet. The second earbud may transmit the audio data in response to the request. The request may be transmitted after a CIS event in which the audio source device transmitted the audio packet and during a CIG interval in which the CIS event occurred. The audio packet may include audio data to be output by the first earbud and the second earbud. The audio data transmitted by the second earbud to the first earbud may include audio data corresponding to only an audio channel to be output by the first earbud. The second processing system of the second earbud may be configured to store encryption credentials for the first earbud. The second processing system of the second earbud may be configured to decrypt the audio packet addressed to only the first earbud using the stored encryption credentials. The second processing system of the second earbud may be configured to cause the second speaker to output audio based on decrypted audio data from the audio packet. The first earbud and the audio source device communicate using Bluetooth Low Energy (LE).

In some embodiments, a method for short-range wireless communication is described. The method may comprise receiving, by a second earbud of a pair of true wireless earbuds, an audio packet addressed to only a first earbud of the pair of true wireless earbuds. A single connected isochronous stream (CIS) within a connected isochronous group (CIG) may be present between the pair of true wireless earbuds and an audio source which transmitted the audio packet. The method may comprise transmitting, by the second earbud to the first earbud, a cross-acknowledgement indicating receipt of the audio packet. The method may comprise transmitting, by the second earbud to the first earbud, audio data from the audio packet.

Embodiments of such a method may include one or more of the following features: the audio packet may include audio data for a first audio channel and audio data for a second audio channel. The audio transmitted to the first earbud by the second earbud may include only audio data for the first audio channel. The method may further comprise determining, by the first earbud, that the audio packet was not successfully received by the first earbud. The method may further comprise receiving, by the first earbud, the cross-acknowledgement from the second earbud. The method may further comprise transmitting, by the first earbud, an acknowledgement to the audio source based on the cross acknowledgement and despite the first earbud determining that the audio packet was not successfully received by the first earbud. The method may further comprise transmitting, by the first earbud, a request directly to the second earbud for audio data from the audio packet. The second earbud may transmit the audio data for the first audio channel directly to the first earbud in response to the request. The request may be transmitted after a CIS event in which the audio source transmitted the audio packet and during a CIG interval in which the CIS event occurred. The method may further comprise outputting, by the first earbud via a first speaker, audio based on the audio data for the first audio channel. The method may further comprise outputting, by the second earbud via a second speaker, audio based on the audio data for the second audio channel. The method may further comprise storing, by the second earbud, encryption credentials for the first earbud. The method may further comprise decrypting, by the second earbud, the audio packet addressed to only the first earbud using the stored encryption credentials. The first earbud and the audio source may communicate using Bluetooth Low Energy (LE).

In some embodiments, a non-transitory processor-readable medium is described. The medium may comprise processor-readable instructions configured to cause a second earbud of a pair of true wireless earbuds to receive an audio packet addressed to only a first earbud of the pair of true wireless earbuds. A single connected isochronous stream (CIS) within a connected isochronous group (CIG) may be present between the pair of true wireless earbuds and an audio source which transmitted the audio packet. The medium may comprise processor-readable instructions configured to cause a cross-acknowledgement indicating receipt of the audio packet to be transmitted to the first earbud. The medium may comprise processor-readable instructions configured to cause audio data from the audio packet to be transmitted to the first earbud.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6E and FIG. 6F illustrates an embodiment of a method for communicating between an audio source and earbuds using a single CIS within a CIG.

FIG. 7D illustrates an embodiment of a method for communicating between an audio source and earbuds using a single CIS within a CIG using a cross acknowledgement.

DETAILED DESCRIPTION

By having a pair of true wireless earbuds communicate with each other, audio output performance can be significantly improved. Conventionally, if an audio packet is not received by a first earbud (which can be a left or right earbud), the first earbud requests retransmission of the audio packet from the audio source device. However, the communication link between the first earbud and the audio source may be weak, such as due to attenuation and interference. Therefore, retransmissions by the audio source may continue to fail to be properly received by the first earbud. Even if received, repeated retransmissions require the use of power at the audio source and at the first earbud, thus decreasing battery life of the audio source (if battery powered) and at least the first earbud.

As detailed herein, a communication link between earbuds, can allow earbuds to relay data received from an audio source device. Rather than using separate connected isochronous stream (CIS) for each audio channel of each earbud, a single CIS, which can be referred to as a "joint CIS," within a connected isochronous group (CIG) may be used in which packets are transmitted that include the audio for both channels (and, thus, both earbuds). As detailed herein, this arrangement can effectively allow the audio source device to communicate with only a single earbud (referred to as the "leader" earbud). The second earbud (referred to as the "hidden" earbud) can instead listen (or "sniff") audio packets sent to the first earbud. The first earbud and the second earbud can then extract audio data corresponding to the correct audio channel from the packet. In some embodiments, if one earbud fails to receive the audio packet, the other earbud can forward the relevant audio data directly to the earbud.

Figure 1:
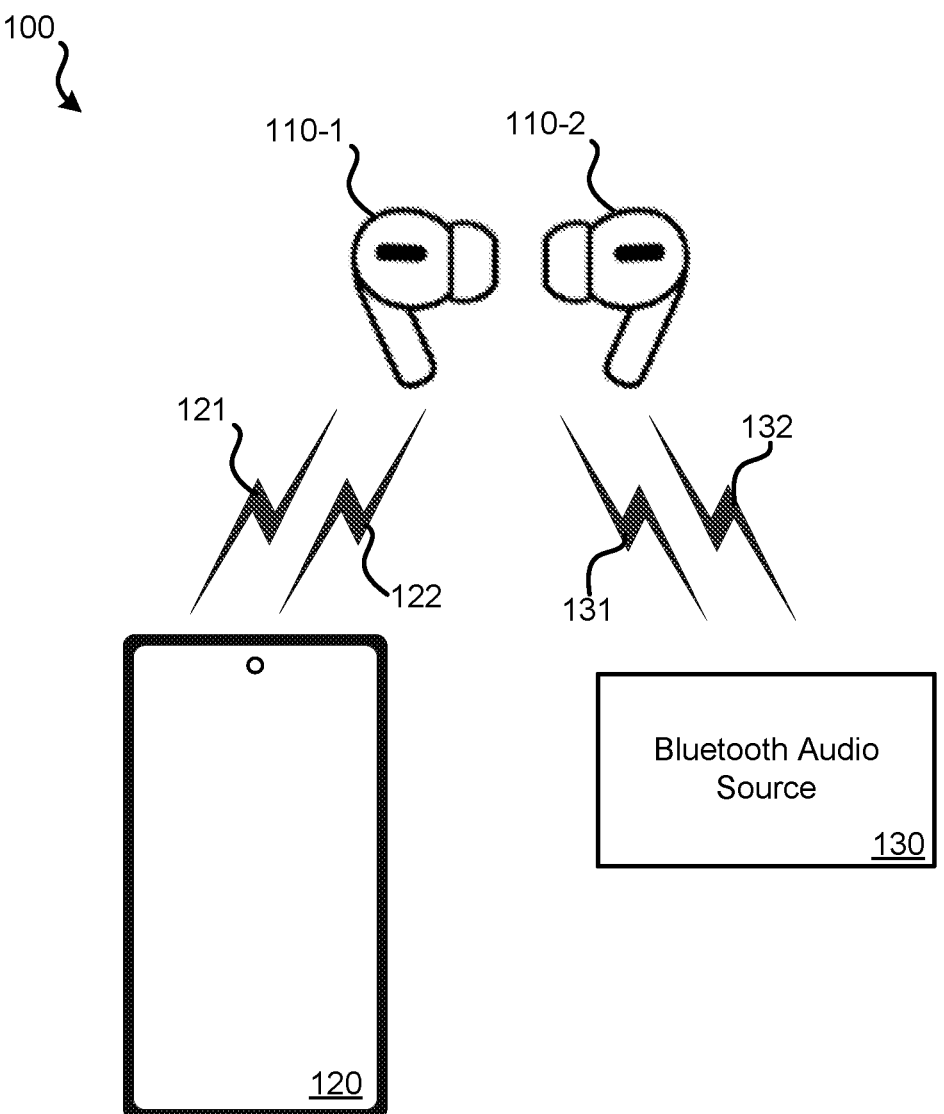
FIG. 1 illustrates an embodiment of an audio system that includes a pair of true wireless earbuds serving as an audio device for multiple audio sources.

FIG. 1 illustrates an embodiment of an audio system 100 including a pair of true wireless earbuds serving as an audio device for multiple wireless audio sources. Audio system 100 can include: earbuds 110 (which include earbud 110-1 and earbud 110-2); audio source 120; and audio source 130.

"True wireless earbuds" refer to earbuds that both: 1) receive audio wirelessly from one or more audio sources; and 2) are not physically connected with each other, such as via a wire. Therefore, in a pair of true wireless earbuds, each earbud must have its own power supply and wireless communication interface to allow for communication. As detailed herein, embodiments of earbuds, unless otherwise noted, are directed to true wireless earbuds, such as earbuds 110.

Audio source 120 can represent various forms of computerized devices capable of outputting Bluetooth communications. As illustrated, one possible form of audio source 120 is a smartphone. For example, a smartphone can output stereo audio (e.g., music, gaming audio, audio for an audio or video conference) and mono audio (e.g., audio for a telephone call, mono audio for an audio or video conference). Many other forms of audio source 120 may be possible, such as: a tablet computer, a gaming device, a laptop computer, a desktop computer, a stereo system, and a television. More generally, any computerized device that outputs Bluetooth audio can serve as audio source 120. Audio source 120, when used for voice phone calls, can alternatively be referred to as a call gateway (CG). As used within this document, audio source 120 can alternatively be used as and referred to as a CG. (In voice call terminology, earbuds 110 can be referred to as a "call terminal.")

While one or more active communication channels are present between audio source 120 and earbuds 110, separate one or more active communication channels can be present between earbuds 110 and at least one additional audio source. As illustrated, another Bluetooth audio source, audio source 130, is present. Again here many other audio sources may be possible, such as: a tablet computer, a gaming device, a laptop computer, a desktop computer, a computerized music device, a stereo system, or a television, or any computerized device that outputs Bluetooth audio can serve as audio source 130.

Various use cases exist where it can be beneficial to a user for earbuds 110 to have communication channels with multiple audio sources. For example, earbuds 110 may receive audio from a computer (e.g., as audio source 120) for a video conference, but the user may desire to allow his smartphone (e.g., as audio source 130) to output notifications that are played instead of or over the audio for the video conference. As another example, a user may be listening to music via their smartphone (e.g., as audio source 120), while listening to the music, the user may be in a public place that outputs auditory notifications via Bluetooth, such as flight notifications at an airport. A computerized system of the airport may function as audio source 130 which causes flight notifications to be output instead of or over the audio being streamed to earbuds 110 by audio source 120.

Notably, audio source 130 may not be present in many embodiments or may only be intermittently present. Referring to the previous example, after leaving the airport (or perhaps disabling notifications) earbuds 110 may only receive audio from audio source 120. Other similar examples exist. For example, referring to the first example, after conclusion of the video conference, earbuds 110 may only receive audio (e.g., the auditory notifications) from their smartphone. While the example of FIG. 1 illustrates two audio sources, it may be possible for earbuds 110 to receive audio from more than two audio sources. Earbuds 110 may be configured to prioritize and/or mix audio received concurrently from different audio sources.

In general, Bluetooth-family protocols are used as the short-range wireless technology standards for exchanging data between audio source 120 (and possibly audio source 130) and earbuds 110. Within the Bluetooth-family, various versions of Bluetooth may be used, depending on the particular embodiment. Bluetooth Basic Rate/Enhanced Data Rate (Bluetooth BR/EDR), which is also referred to as Bluetooth "Classic," can be used in various embodiments as detailed herein. Some embodiments detailed herein rely on Bluetooth Low Energy (LE) or LE Audio as the specific Bluetooth-family protocol for communication. The same hardware may be used to implement any of these Bluetooth-family protocols.

Further, embodiments detailed herein may use one or more of these Bluetooth-family protocols as a starting point, but may have additional features that go beyond the specification of the standard. These additional features require both an audio source and earbuds that are compatible with the additional features to be used in order for the additional features to be available. As an example, one manufacturer may produce earbuds and audio sources (e.g., smartphones, laptop computers, tablet computers) that support additional features that go beyond the minimum features of a Bluetooth-family protocol when used together. However, when one of such devices is used with another manufacturer's devices, such additional features beyond the Bluetooth-family may not be available unless the manufacturers have cooperated on implementing the additional features.

While the embodiments detailed herein are focused on improvements to Bluetooth-family protocols, it should be understood that the embodiments detailed herein can also be applied to other short-range communication protocols that could be used between audio devices and audio sources.

As illustrated, for Bluetooth LE or LE Audio, separate data streams may be used between an audio source and each earbud of earbuds 110. A connected isochronous stream (CIS) may be present on link 121 from audio source 120 to earbud 110-1. A separate CIS may be present as part of link 122 to earbud 110-2. If audio is being transmitted from an earbud of earbuds 110 to audio source 120 (e.g., from a microphone of an earbud for a phone call), another CIS may be present from an earbud to audio source 120. Alternatively, the same CIS can be used for transmitting microphone audio from an earbud to audio source 120. Separate CISs may also exist as part of wireless communications 131 and wireless communications 132 between audio source 130 and earbuds 110. Separately, between each audio source and each earbud, can be another channel, referred to as an asynchronous connection-oriented link (ACL) that allows for control data to be transmitted between the audio source and the particular earbud in both directions.

For mono audio (e.g., a phone call, videoconference), the audio transmitted to each earbud of earbuds 110 from an audio source, such as audio source 120, may be the same. For stereo audio (e.g., music playback, gaming), the audio transmitted to each earbud of earbuds 110 differs.

Figure 2:
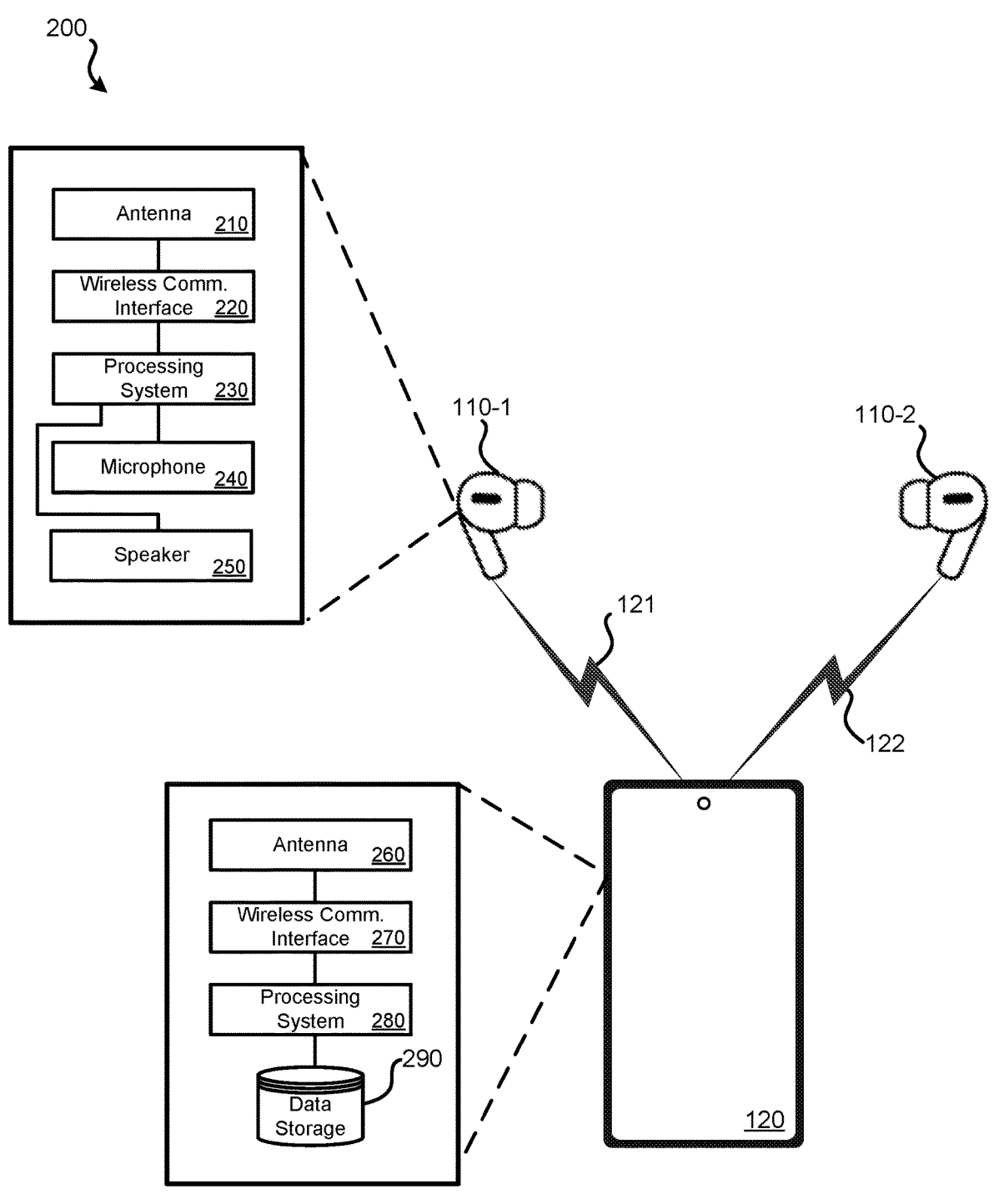
FIG. 2 illustrates an embodiment of a block diagram of an audio system that includes a pair of true wireless earbuds communicating with an audio source.

FIG. 2 illustrates an embodiment of a block diagram of an audio system 200 that includes a pair of true wireless earbuds communicating with an audio source. Audio system 200 can represent an embodiment of audio system 100 in which only a single audio source is present. Audio system 200 can include earbuds 110 and audio source 120.

Referring to earbuds 110, components of earbud 110-1 can include: antenna 210; wireless communication interface 220; processing system 230; microphone 240; and speaker 250. Earbud 110-2 may have the same components. Antenna 210 can be used for receiving and transmitting Bluetooth-family communications, including BR/EDR, and LE (including LE Audio which uses LE). Wireless communication interface 220 can be implemented as a system on a chip (SOC). Wireless communication interface 220 can include a Bluetooth radio and componentry necessary to convert raw incoming data (e.g., audio data, other data) to Bluetooth packets for transmission via antenna 210. A single radio may be present on each of earbuds 110, thus requiring transmissions, even on different frequencies, to occur at different times. Wireless communication interface 220 may also include componentry to enable one or more alternative or additional forms of wireless communication, both with an audio source and between earbuds. Processing system 230 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums, such as random access memory (RAM), and/or flash memory. In some embodiments, processing system 230 and wireless communication interface 220 may be part of a same circuit or SOC.

In some earbuds, microphone 240 may be present. In some embodiments, each of earbuds 110 has a microphone. In other embodiments, only one of earbuds 110 has a microphone. In still other embodiments, no microphone may be present in either of earbuds 110. Audio captured using the one or more microphones of earbuds 110 can be transmitted to audio source 120. This audio, which can be referred to as "upstream" audio, may include voice, such as for use in a telephone call, video conference, gaming, etc. Various componentry (not illustrated) may be present between wireless communication interface 220, processing system 230, and microphone 240, such as an analog to digital converter (ADC) and an amplifier.

Speaker 250 converts received analog signals to audio. Various componentry (not illustrated) may be present between wireless communication interface 220, processing system 230, and speaker 250, such as a digital to analog converter (DAC) and an amplifier.

Various components of earbud 110-1 are not illustrated. In addition to the ADC, DAC, and amplifiers previously mentioned, earbud 110-1 also includes a power storage component, such as one or more batteries, and associated componentry to allow for recharging of the power storage component. Also present is a housing and componentry to hold earbud 110-1 within a user's ear. One or more non-transitory processor readable mediums can be understood as present and accessible by wireless communication interface 220, processing system 230, or both. For instance, such mediums may be used for temporary storage of data (e.g., buffers) and storing data necessary for Bluetooth communication (e.g., encryption keys).

Audio source 120 can include: antenna 260; wireless communication interface 270; processing system 280; and data storage 290. Antenna 260 can be used for receiving and transmitting Bluetooth-family communications, including BR/EDR, and LE. Wireless communication interface 270 can be implemented as a system on a chip (SOC). Wireless communication interface 270 can include a Bluetooth radio and componentry necessary to convert raw incoming data (e.g., audio data, other data) to Bluetooth packets for transmission via antenna 260. Wireless communication interface 270 can additionally or alternatively be used for one or more other forms of wireless communications. Processing system 280 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored locally using one or more non-transitory processor-readable mediums via data storage 290, which can include random access memory (RAM), flash memory, a hard disk drive (HDD) and/or a solid-state drive (SSD). In some embodiments, processing system 280 and wireless communication interface 270 may be part of a same circuit or SOC.

Audio source 120 can include various other components. For example, if audio source 120 is a smartphone, various components such as: one or more cameras, a display screen or touch screen, volume control buttons, or other wireless communication interfaces can be present.

Figure 3:
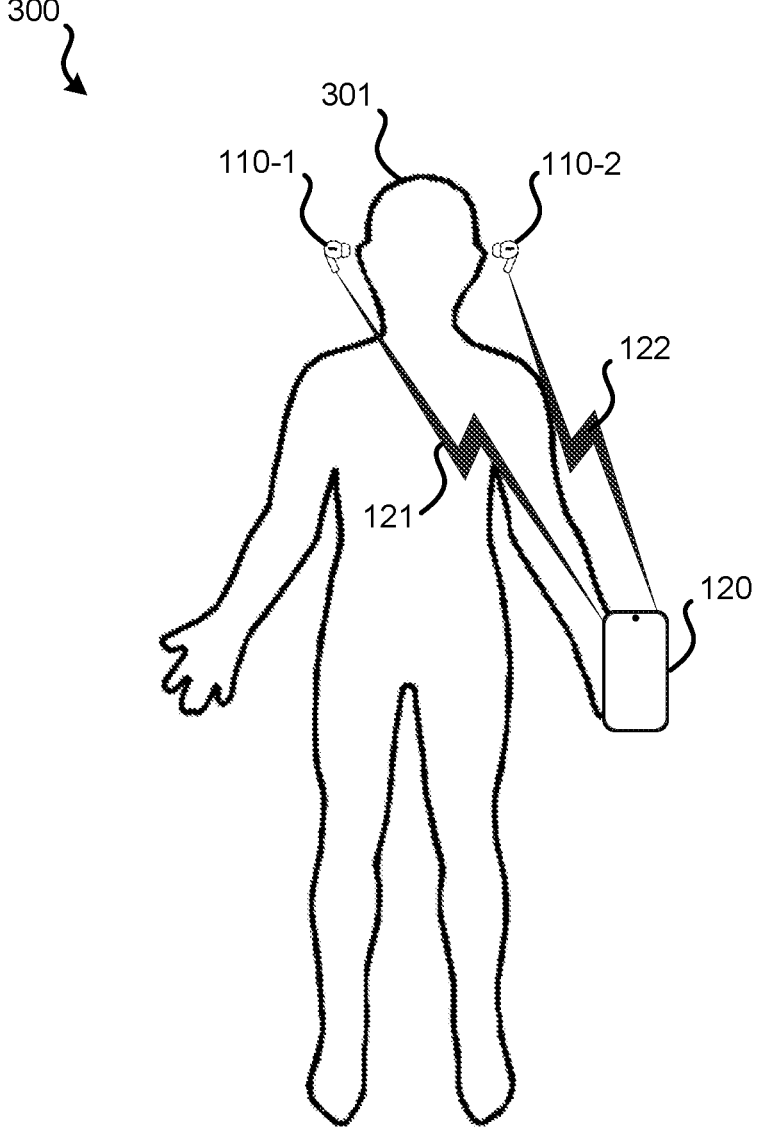
FIG. 3 illustrates an embodiment of cross-body attenuation resulting in communication between an audio source (or call gateway) and a first earbud experiencing more attenuation than communication between the audio source and the second earbud.

FIG. 3 illustrates an embodiment 300 of cross-body attenuation resulting in communication between an audio source and a first earbud experiencing more attenuation (or path loss) than communication between the audio source and the second earbud. In embodiment 300, user 301 is holding audio source 120 in their left hand (that is, as illustrated, user 301 is facing out of the page). Bluetooth communications occur between audio source 120 and earbud 110-2 as indicated by link 122; Bluetooth communications between audio source 120 and earbud 110-1 as indicated by link 121.

Due to audio source 120 being in the user's left hand, link 121 with earbud 110-1, which is in the user's right ear, results in wireless signals travelling through more of the user's body than link 122. Therefore, more attenuation occurs in link 121 than link 122. Accordingly, it is more likely that Bluetooth data packets exchanged between earbud 110-1 and audio source 120 may be not properly received than Bluetooth data packets exchanged between earbud 110-2 and audio source 120.

Which earbud experiences more attenuation and/or interference in its communications with an audio source can vary based on the location of audio source 120. Common places where user 301 may keep audio source 120 are: in a left hand; in a right hand; in a front left or right pocket, in a rear left or right pocket; on an arm band; in a left or right chest pocket; and on a surface or dock. Each of these locations can result in significantly different communication paths between each earbud and the antenna of the audio source and, thus, one earbud's communications can experience significantly higher interference or attenuation than the other earbud's communications.

Figure 4:
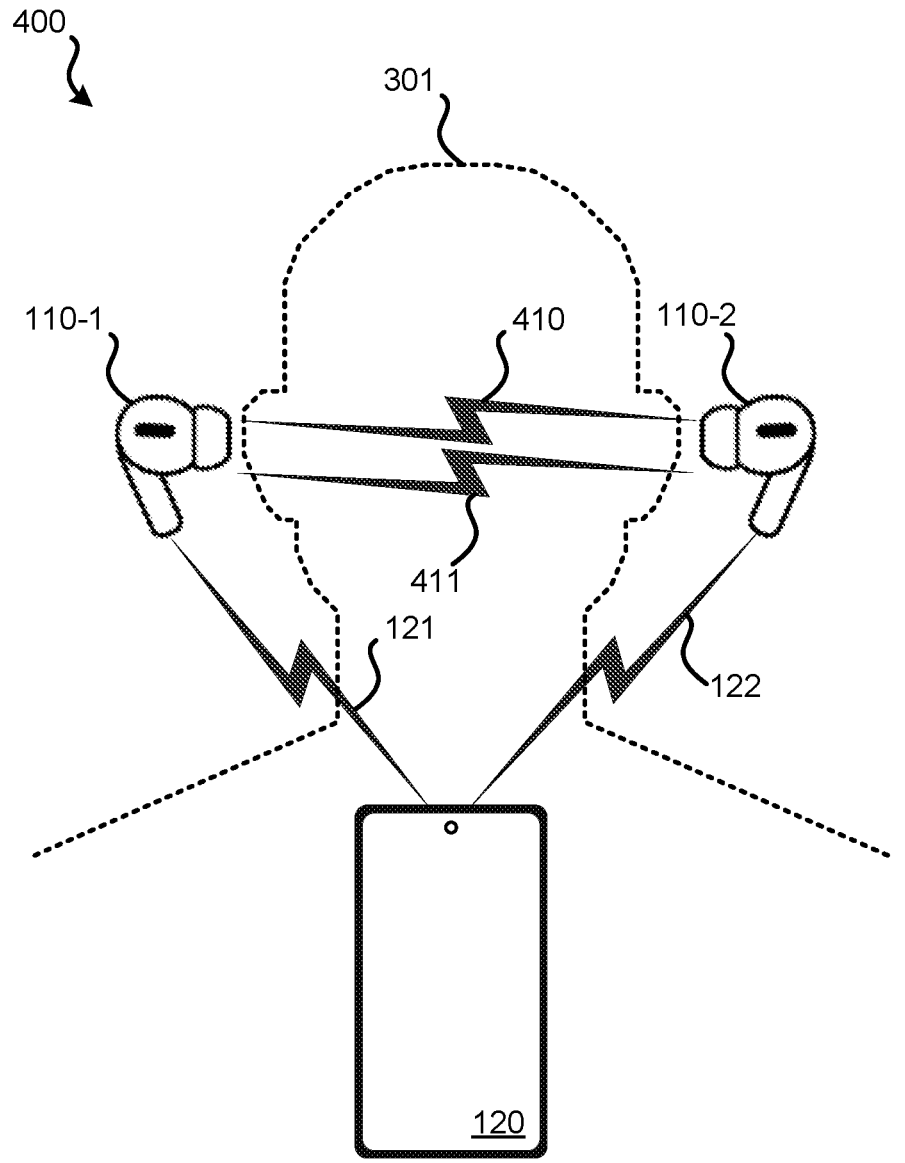
FIG. 4 illustrates an embodiment of an audio system in which true wireless earbuds communicate with each other in addition to communicating with an audio source.

FIG. 4 illustrates an embodiment of an audio system 400 in which true wireless earbuds communicate with each other in addition to communicating with an audio source. Earbud 110-1 can perform wireless communications using cross-link 410 with earbud 110-2 and, similarly, earbud 110-2 can perform wireless communications using cross-link 411 with earbud 110-1 in some embodiments. This communication can occur via a proprietary link specific to earbuds 110 and therefore can be outside of any Bluetooth family protocol specification. The path between earbuds 110, when in use by user 301, is predictable because the distance and the object through which the signals pass (the head of user 301) remain constant. As detailed herein, the ability of earbuds 110 to communicate with each other can have significant advantages.

Cross-links 410 and 411 can use LE 2M, LE HDT (pending standardization), LE proprietary high data rate modes, classic BR/EDR, or some proprietary communication scheme. Therefore, while Bluetooth-compliant wireless communications occur between earbuds 110 and audio source 120, communications directly between earbuds do not necessarily need to be compliant with Bluetooth or any other particular communication protocol.

In some embodiments, communication between earbuds 110 can be a cross-acknowledgement, referred to as a CrossACK for short. As detailed herein, "cross-" communications refer to wireless communications transmitted directly from a first earbud and received by a second earbud. A CrossACK can allow one of earbuds 110 to notify the other earbud of earbuds 110 that a Bluetooth packet was properly received from a source device. A CrossACK and data packets between earbuds can be sent using the same radio used for Bluetooth communications. At a high level, when a packet addressed to only a first earbud is not properly received by the first earbud, but is properly received by the second earbud, the second earbud can transmit a CrossACK to the first earbud. The first earbud may then request the packet be relayed to the first earbud from the second earbud. This arrangement prevents the first earbud from having to request retransmission from the source device and/or can allow the first earbud to obtain the data from the second earbud if transmissions from the audio source continue to fail.

Figure 5:
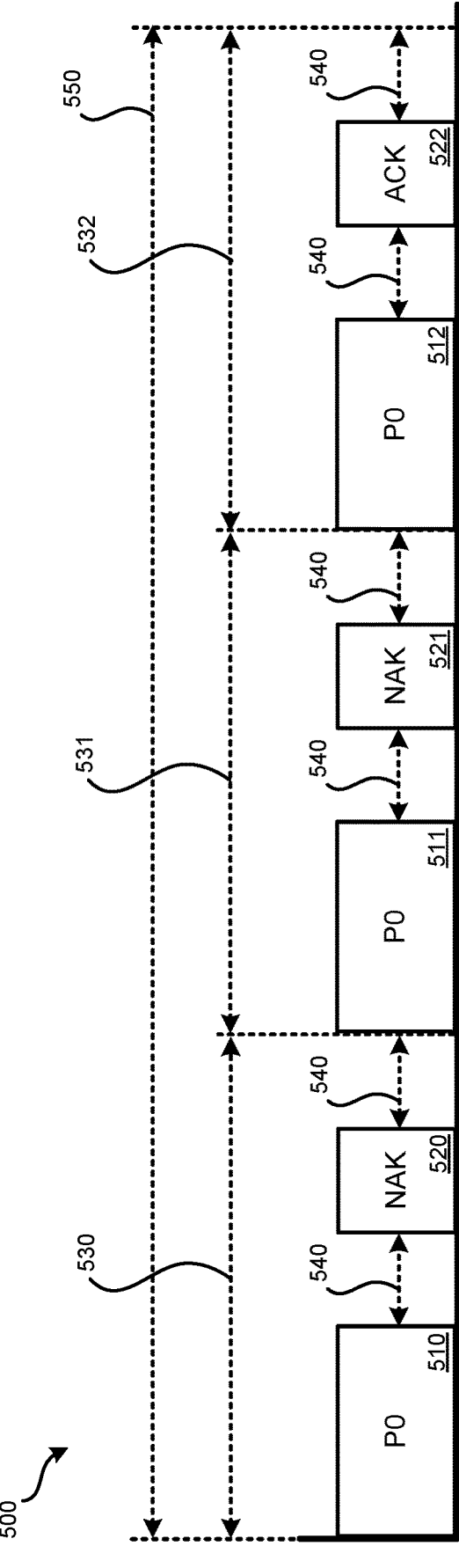
FIG. 5 illustrates an embodiment of a timing diagram in which a single connected isochronous stream (CIS) is used within a connected isochronous group (CIG) for providing audio to both earbuds.

FIG. 5 illustrates an embodiment 500 of a timing diagram in which a single connected isochronous stream (CIS) event is used within a connected isochronous group (CIG) interval for providing audio to both earbuds. Embodiment 500 shows the timing of communications between the audio source device and the leader earbud. From the perspective of an audio source device, such as audio source 120, the audio source device can be configured to communicate with a single output device that outputs two audio channels. As an example of such a device, a pair of over-the-head headphones may use a single Bluetooth communication link for transmitting audio from the audio source to the headphones. In contrast, the arrangement of FIG. 5 is used for communication with true wireless earbuds, which requires that each audio channel be transmitted wirelessly to the associated earbud (e.g., a left audio channel for a left earbud, a right audio channel for the right earbud).

In the timing diagram of embodiment 500, a single CIS event, joint CIS event 550, is shown. In this embodiment, each CIS event has three subevents (subevent 530, subevent 531, and subevent 532). Since a single CIS event is used to transmit audio for two audio channels, each audio packet transmitted by the audio source includes audio data for both channels. Packet 510, labelled P0, includes audio data from the audio source device for the left and the right audio channels. Packet 510, for example, can be 240 bytes in size. If the communication mode used on the physical Bluetooth LE communication link from the audio source to the leader earbud is 2M PHY, the duration of transmission of packet 510 may be 1020 us.

Within subevent 530, regardless of whether audio packet 510 was properly received by the leader earbud, the leader earbud may transmit negative acknowledgment ("NAK") 520. In this communication mode, duration 540 may be 150 us. One or more NAKs may be transmitted by the leader earbud to increase the number of opportunities the hidden earbud has to receive the audio data in audio packet 510.

In response to NAK 520, the audio source device retransmits the same audio data as packet 511. In this example, regardless of whether properly received or not, the leader earbud transmits NAK 521. This results in the audio source device retransmitting the same audio data as packet 512. In the illustrated embodiment, the leader earbud is configured to cause two retransmissions (for a total of three transmissions). After the third transmission, the leader earbud transmits acknowledgement ("ACK") 522, which triggers to the audio source to no longer retransmit the same audio data.

Each of audio packets 510, 511, and 512, audio data (e.g., half of the audio data) is present for the left audio channel and audio data (e.g., half of the audio data) is present for the right audio channel for stereo audio. For mono audio, each of audio packets 510, 511, and 512 includes audio data that is used for both the left and right audio channels; therefore, half as much audio data needs to be transmitted. The right earbud (whether the right earbud happens to be the leader or the hidden earbud) only uses audio for the right channel to output sound; the left earbud only uses audio for the left channel to output sound. In some embodiments, rather than simply discarding the audio data for the other channel, the audio data for the opposite channel may be temporarily stored in case the audio data is needed by the other earbud, such as detailed in relation to FIG. 6A.

In embodiment 500, joint CIS event 550 has three sub-events. Therefore, the leader earbud may transmit a NAK in response to packet 510 and retransmission of the audio data as packet 511 to ensure that the hidden earbud has three total opportunities to receive the audio data. Therefore, in some embodiments, the number of transmissions of the audio data of packet 510 is set to be the same number of subevents within the CIS event. This arrangement can help minimize wasted subevents by ensuring that audio data is transmitted during every subevent in the CIS event. In other embodiments, the number of transmissions as controlled by the primary earbud may be greater or fewer than the number of subevents within the CIS event.

Notably, while each packet is significantly larger in size due to audio being present for two channels as opposed to one, there remains a significant advantage to using a single CIS event with data for two audio channels in each packet rather than separate CIS events for each audio channel, even with multiple retransmissions of the audio data. Table 1 summaries the total air time savings based on the number of subevents within a CIG interval. As an example of how the air time duration values are calculated, for embodiment 500, the durations of packet 510, duration 540, NAK 520, duration 540 (again) would be summed then multiplied by the number of subevents (three, in this example). An instance of duration 540 would then be subtracted to account for the final time spacing, which is not included in the air time calculation. The column in Table 1 labeled "Joint CIS" refers to the embodiments detailed herein, such as embodiment 500. Air Time Savings refers to the amount of air time saved by using the arrangements detailed herein compared with the standard separate CIS of LE audio for each earbud. Expressed another way, Table 2 indicates the percentage of the total duration used by the Joint CIS solutions.

TABLE 1

| Number of Subevents | Total Duration for Standard LE Audio Solution (us) | Total Duration for Joint CIS Solution (us) | Air Time savings (us) |
|---|---|---|---|
| 3 | 5154 | 3942 | 1212 |
| 4 | 6922 | 5306 | 1616 |
| 5 | 8690 | 6670 | 2020 |

TABLE 2

| Number of Subevents | Total Duration for Joint CIS Solution (as a percentage of the total duration for Standard LE Audio) | Air Time savings (as a percentage of the total duration for Standard LE Audio) |
|---|---|---|
| 3 | 76.5% | 23.5% |
| 4 | 76.7% | 23.3% |
| 5 | 76.8% | 23.2% |

Figure 6A:
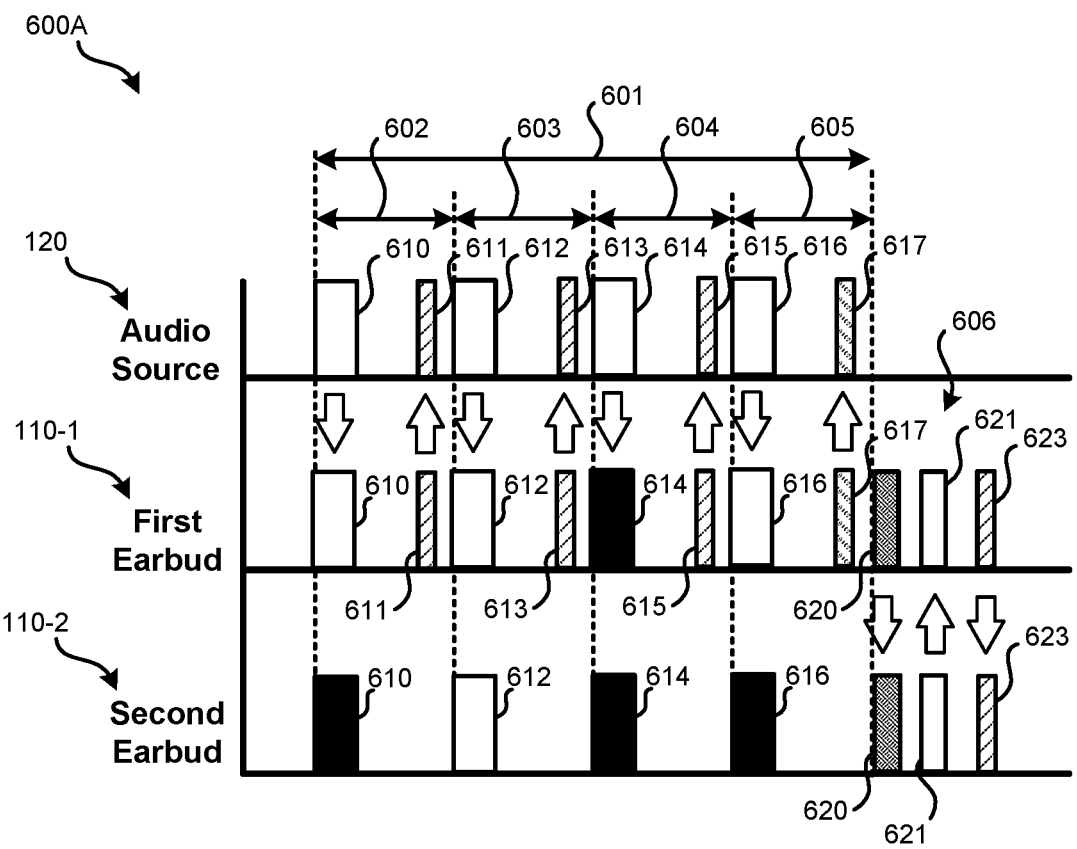
FIG. 6A illustrates an embodiment of communications between an audio source and earbuds using a single joint CIS event within a CIG interval.

FIG. 6A illustrates an embodiment 600A of communications between an audio source and true wireless earbuds using a single CIS event within a CIG interval. From the perspective of audio source 120, audio packets are being sent via Bluetooth LE to a single audio output device. As detailed in relation to FIG. 5, within a CIG interval, a single CIS event is used to transmit audio data for two audio channels (e.g., left and right). Such an arrangement may not require any special configuration on the audio source device, since using a single CIS event in a CIG interval with audio data for both channels can be a standard Bluetooth LE configuration.

In the example of FIG. 6A, first earbud 110-1 is used as the leader earbud. In embodiment 600A, first earbud 110-1 can be the left or the right earbud. In other embodiments, second earbud 110-2 can be the leader earbud. Further, second earbud 110-2 can be the right or left earbud. Within a single CIG interval, only a single CIS event 601 occurs in which one or more audio packets are transmitted that includes audio data for both audio channels. As illustrated, CIS event 601 includes four subevents: subevent 602, subevent 603, subevent 604, and subevent 605.

Figure 6B:
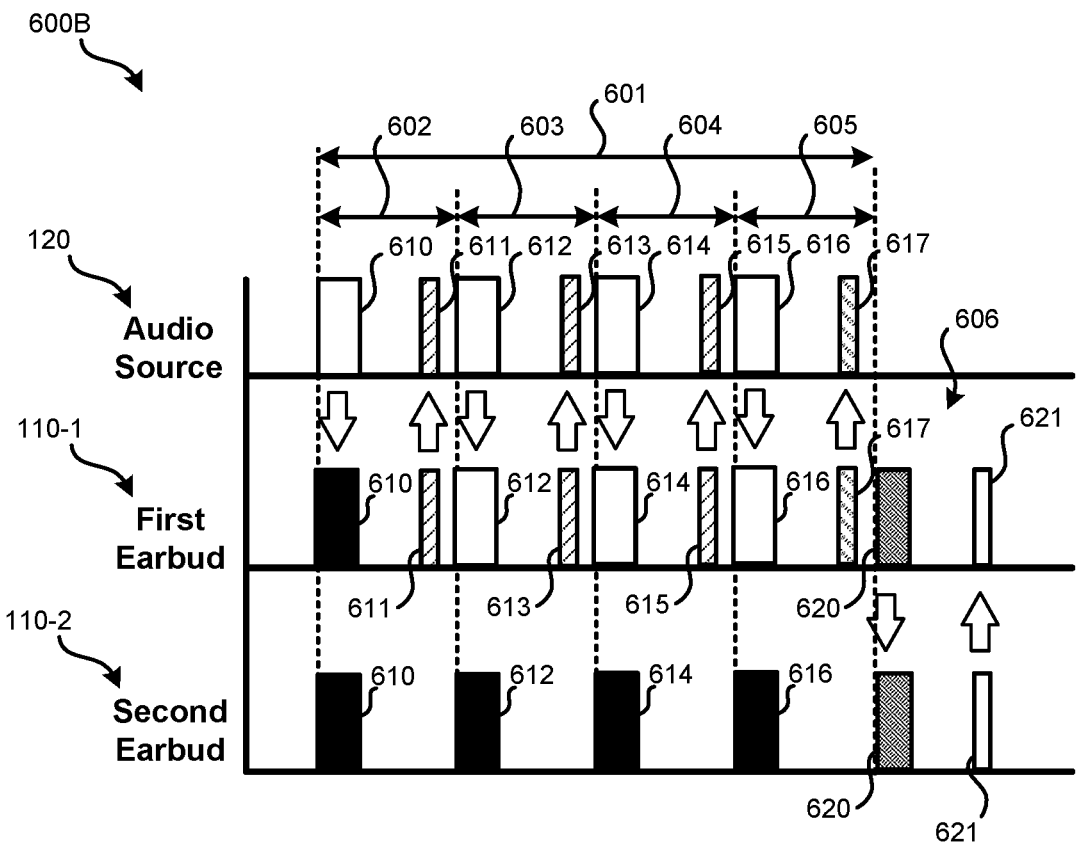
FIG. 6B illustrates an embodiment of communications between an audio source and earbuds using a single joint CIS event within a CIG interval in which the second earbud did not receive the transmitted audio packet.
Figure 6C:
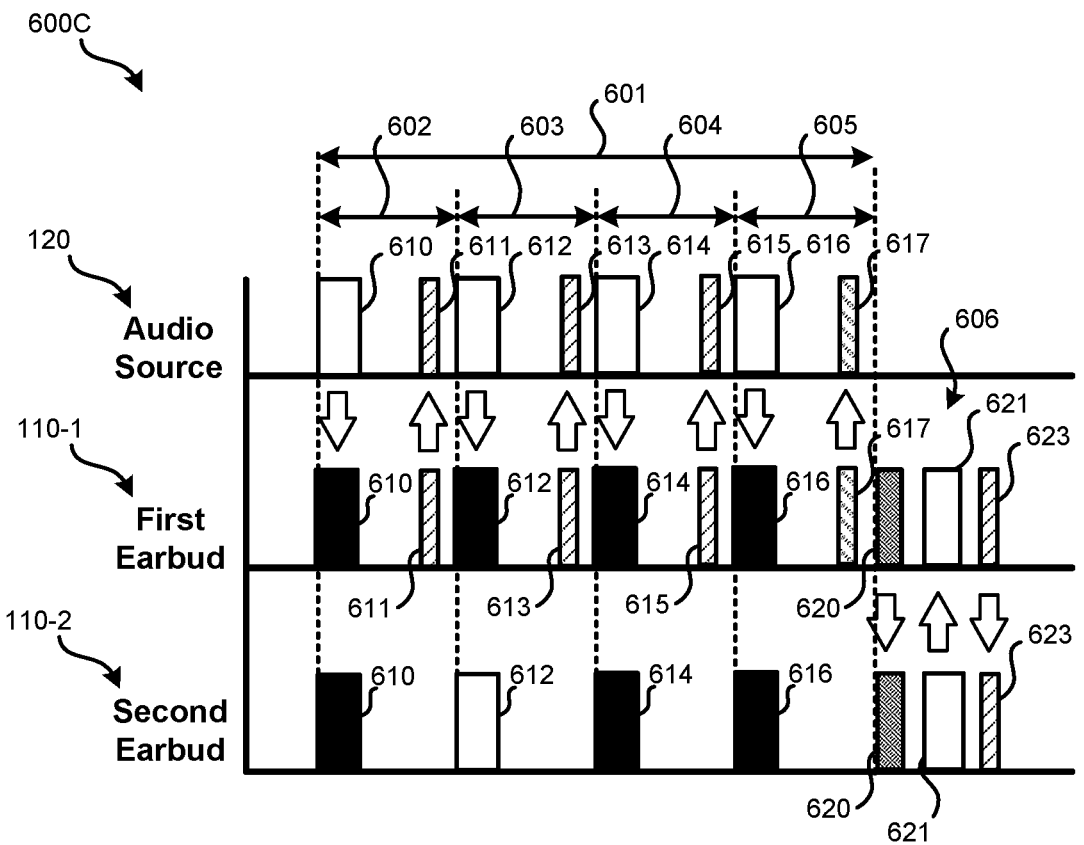
FIG. 6C illustrates an embodiment of communications between an audio source and earbuds using a single joint CIS event within a CIG interval in which the first earbud did not receive the transmitted audio packet.
Figure 6D:
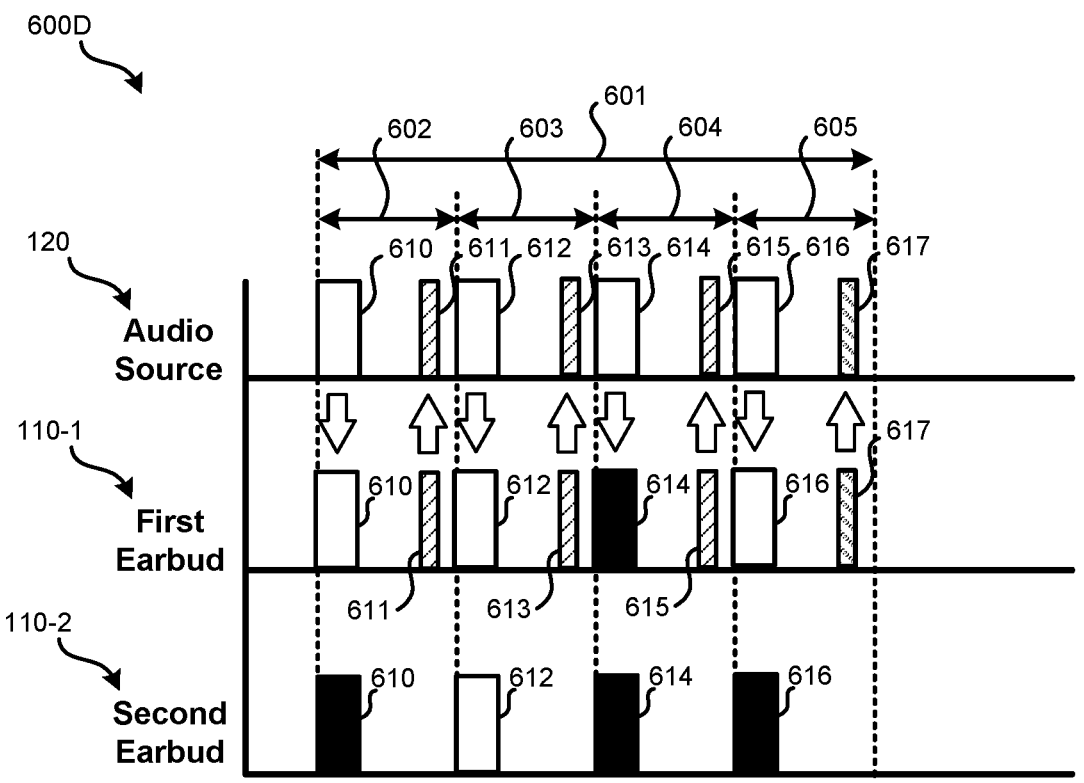
FIG. 6D illustrates an embodiment of communications between an audio source and earbuds using a single joint CIS event within a CIG interval without relay of audio between earbuds.
Figure 6E:
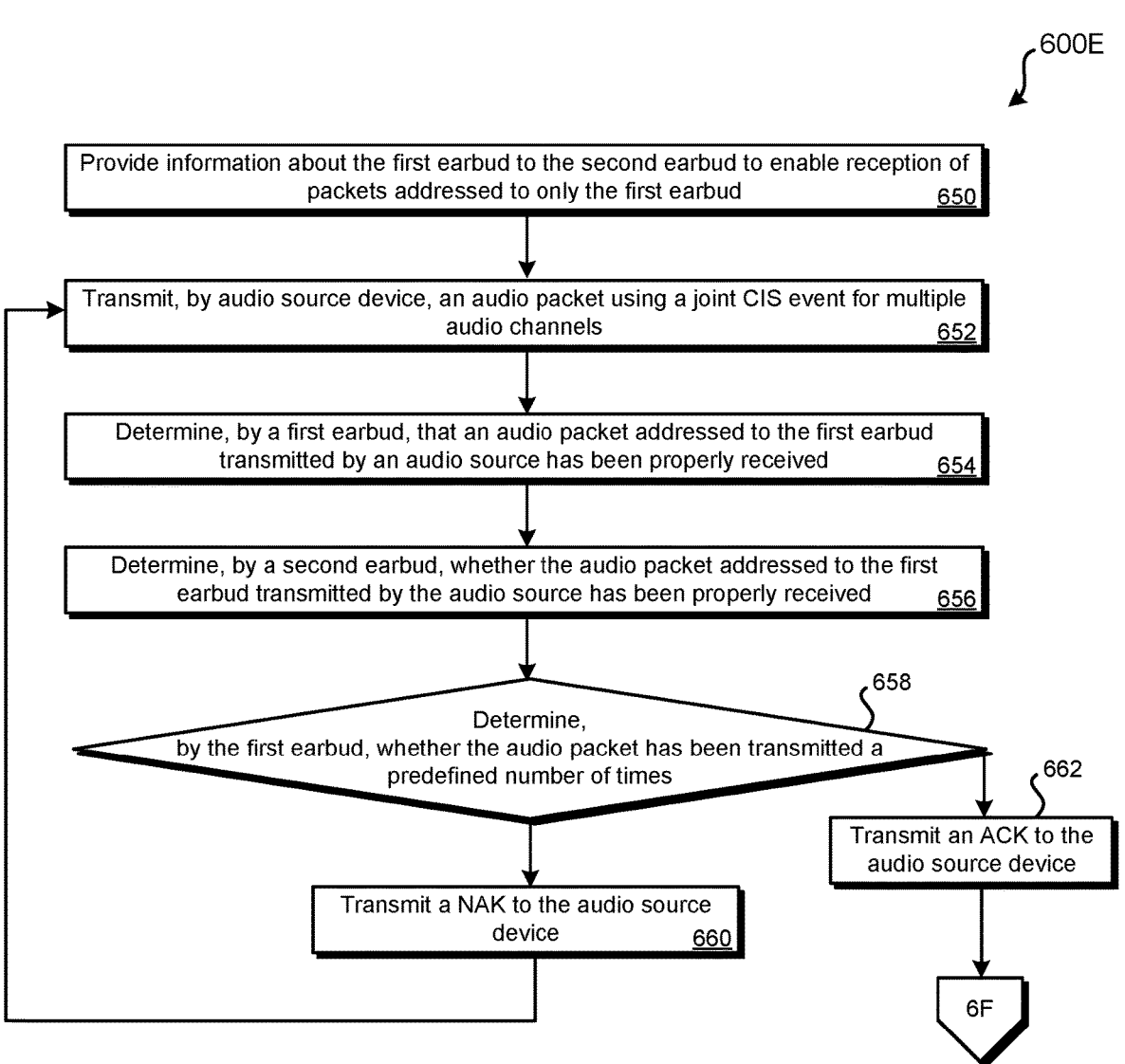

FIG. 6E and FIG. 6F illustrate an embodiment of a method 600E for communicating between an audio source and earbuds using a single CIS within a CIG. At some point prior to CIS event 601 occurring, at block 650, a setup or configuration process is performed in which credentials for the leader earbud (earbud 110-1 in this embodiment) are provided to the hidden earbud (second earbud 110-2 in this embodiment). Earbuds 110 may exchange information in order to successfully receive the packets addressed exclusively for the other earbud on a CIS meant for the other earbud (e.g. CIS timing information, CIS properties like physical layer used, encryption keys, etc.), thus allowing sniffed packets addressed to the other earbud to be successfully received and decrypted.

Audio source 120 transmits audio packet 610 at the start of subevent 602 at block 652. Audio packet 610 includes audio data for two audio channels. In the illustrated example of embodiment 600A, first earbud 110-1 properly receives audio packet 610. Only a single CIS is used within the CIG interval to transmit audio to the earbuds, therefore the CIS event can be referred to as a joint CIS event.

Second earbud 110-2, which in this example is the hidden earbud, does not communicate directly with the audio source 120. However, earbud 110-2 has the encryption credentials of earbud 110-1 and other data necessary to intercept or "sniff" communications transmitted by audio source 120 to earbud 110-1. Therefore, earbud 110-2 may be able to successfully receive audio packet 610 and decrypt the contents despite audio source only transmitting packet 610 with the intention of it being received by earbud 110-1.

At block 654, earbud 110-1 receives and determines it has properly received the audio packet transmitted by the audio source device. At block 656, earbud 110-2 attempt to receive and determines whether it has properly received the audio packet transmitted by the audio source device that was addressed to only the earbud 110-1. In the embodiment of FIG. 6A, the audio packet is not properly received. If it was properly received, the audio data would be stored and processed. At block 658, earbud 110-1 determines whether a predefined number of transmissions (or retransmissions) of the audio data has occurred by the audio source. If the predefined number has not been reached, despite properly receiving audio packet 610, earbud 110-1 transmits NAK 611 to audio source 120 at block 660. (In some other embodiments, NAK 611 and/or subsequent NAKs are not transmitted. Rather, an implicit NAK is provided to audio source 120 by not transmitting any response. The lack of response to a transmitted packet can be interpreted as a NAK by audio source 120.) Earbud 110-1 at this stage does not have data indicating whether earbud 110-2 properly received audio packet 610. Therefore, earbud 110-1 transmits a predefined number of NAKs to increase the likelihood that the audio data of audio packet 610 is received by earbud 110-2.

During subevent 603, in response to NAK 611, audio source 120 retransmits the same audio data as audio packet 610 as audio packet 612. In the illustrated embodiment, first earbud 110-1 successfully receives audio packet 612 (but the contents can be discarded or ignored since the same audio data was received in audio packet 610). Alternatively, since audio packet 610 was properly received, earbud 110-1 may not attempt to receive audio packet 612 or subsequent packets within CIS event 601. However, earbud 110-2 is able to successfully sniff audio packet 612. By being the hidden earbud, earbud 110-2 does not inform earbud 110-1 or audio source 120 within subevent 603. In response to audio packet 612, despite successfully receiving, earbud 110-1 transmits NAK 613. In this embodiment, NAK 613 is transmitted because a predefined number of transmissions (or retransmissions) of the audio data of audio packet 610 has not yet occurred.

During subevent 604, in response to NAK 613, audio source 120 retransmits the same audio data as audio packet 610 as audio packet 614. In the illustrated embodiment, first earbud 110-1 fails to successfully receives audio packet 614 (which is immaterial since the same audio data was received in audio packet 610). Here earbud 110-2 also fails to successfully sniff audio packet 614. This is also immaterial since the same audio data was received in audio packet 612. (Since audio packet 612 was properly received by second earbud 110-2, future transmissions of the same audio data within CIS event 601 may be ignored by second earbud 110-2 without an attempt being made to receive the data.) In response to audio packet 614, despite already having properly received the audio data in audio packet 610, earbud 110-1 transmits NAK 615. In this embodiment, NAK 615 is transmitted because a predefined number of transmissions (or retransmissions) of the audio data of audio packet 610 has not yet occurred.

During subevent 605, in response to NAK 615, audio source 120 retransmits the same audio data as audio packet 610 as audio packet 616. In the illustrated embodiment, first earbud 110-1 successfully receives audio packet 616, which is immaterial since the same audio data was received in audio packet 610. Here earbud 110-2 fails to successfully sniff audio packet 616. This failed reception is immaterial since the same audio data was received in audio packet 612. In embodiment 600A, the predefined number of retransmissions is 3 (or the predefined number of total transmissions is 4, which happens to be the same number of subevents in CIS event 601). Therefore, following block 658, earbud 110-1 transmits ACK 617 at block 662. In another situation, if earbud 110-1 had not properly received packet 616, ACK 617 would still be transmitted because the audio data was previously properly received and the maximum number of transmissions has been reached. In response to ACK 617, audio source 120 does not reattempt any further transmissions of the audio data in a future CIS event during the next CIG interval.

Following CIS event 601, both earbuds have properly received the audio data of audio packet 610. Each earbud decrypts the received audio packet and extracts the audio data corresponding to the earbud's audio channel to be output. The audio data corresponding to the audio channel of the earbud (e.g., left channel for the left earbud) is output via the earbud's speaker.

At the conclusion of subevent 605, each earbud of earbuds 110 does not have information indicating whether the other earbud successfully received the audio data. Following CIS event 601 within the CIG interval, earbuds 110 have the opportunity to exchange audio data via cross communications 606 occurring with the same CIG interval as CIS event 601. This exchange may only occur if needed or, in some embodiments, may always be performed.

In a first set of embodiments, communication links may be present between first earbud 110-1 and second earbud 110-2 in each direction. This link may be some other form than a CIS used for transmitting audio data from audio source 120 to earbuds 110, such as an ACL link. On a respective link, if audio data is needed (e.g., all four attempts at reception failed in embodiment 600A for a particular earbud), the earbud could transmit a request within the CIG interval after completion of the single CIS event directly to the other earbud. In response to this request, the other earbud may transmit a packet that includes the audio data, which may include only the audio for the audio channel needed by the requesting earbud. In response to receiving the packet, an ACK may be transmitted.

In another set of embodiments, as illustrated in FIG. 6A and detailed in method 600E, only a single communication link (e.g., Bluetooth LE link) is present between earbud 110-1 and earbud 110-2. After completion of CIS event 601, earbud 110-1 may transmit packet 620 including only the audio data for the audio channel associated with second earbud 110-2 (excluding the audio data for the audio channel to be output by earbud 110-1) to second earbud 110-2 at block 664. If available, the audio data for the audio channel associated with second earbud 110-2 is transmitted because first earbud 110-1 does not have information indicating whether or not second earbud 110-2 requires the audio data from audio packet 610. Alternatively, a handshake between earbuds 110 can be performed before sending audio data. The handshake is used by earbud 110-1 to determine if second earbud 110-2 needs the audio data or not. If the second earbud 110-2 needs the audio data, then the audio data is transmitted by first earbud 110-1. If the second earbud 110-2 does not needs the audio data, then the audio data is not transmitted by first earbud 110-1. This arrangement can be more energy efficient compared with blindly sending the audio data.

Alternatively, as part of the handshaking process, earbud 110-1 may request the audio data of audio packet 610, which would occur if first earbud 110-1 did not properly receive any of packets 610, 612, 614, and 616. If packet 620, which could be part of the handshaking process, included a request, packet 621 includes the audio data for the audio channel to be output by earbud 110-1 (and possibly excluding the audio data for the audio channel to be output by earbud 110-2) received during the CIG interval at block 666. If packet 620 did not include a request, packet 621 may be an ACK to acknowledge proper receipt of packet 620. (If a NAK is transmitted instead, the audio data of packet 620 may be triggered to be retransmitted within the CIG interval.) If packet 621 included audio data, ACK 623 may be transmitted at block 668. (If a NAK is transmitted instead, the audio data of packet 621 may be triggered to be retransmitted within the CIG interval.)

Using the audio from the joint CIS event, each earbud can output its respective audio channel. At block 670, earbud 110-1 outputs audio based on the audio data from the audio packet corresponding to the first earbud's audio channel via its speaker. At block 672, earbud 110-2 outputs audio based on the audio data from the audio packet corresponding to the second earbud's audio channel via its speaker.

FIG. 6B illustrates an embodiment 600B of communications between an audio source and true wireless earbuds using a single CIS event within a CIG interval, as in FIG. 6A. In embodiment 600B, second earbud 110-2 fails to receive each transmission of the audio data of audio packet 610. From the perspective of audio source 120, audio packets are being sent via Bluetooth LE to a single audio output device. As detailed in relation to FIG. 5, within a CIG interval, a single CIS event is used to transmit audio data for two audio channels (e.g., left and right). Such an arrangement may not require any special configuration on the audio source device, since using a single CIS event in a CIG interval with audio data for both channels can be a standard Bluetooth LE configuration. Again here, earbud 110-1 is functioning as the leader earbud and earbud 110-2 is functioning as the hidden earbud.

Embodiment 600B proceeds generally in accordance with embodiment 600A. In this example, both earbuds 110 failed to receive audio packet 610. In response, earbud 110-1 sends NAK 611 (which would have been a NAK even if audio packet 610 was properly received).

A key difference to embodiment 600B is that second earbud 110-2 failed to receive each transmission of the audio data of audio packet 610. Therefore, following CIS event 601 second earbud 110-2 has not received the audio data, but earbud 110-1 has receive the audio data for both audio channels.

Following CIS event 601 and within the same CIG interval, a handshaking process can be performed in order to determine whether audio data should be transmitted to second earbud 110-2 by first earbud 110-1. Following handshaking, since earbud 110-2 needs its audio data, earbud 110-1 sends the audio data for the audio channel of second earbud 110-2 in packet 620 within the same CIG interval following CIS interval 601 using a separate Bluetooth LE communication link between earbuds 110 (or via a proprietary link). If audio packet 620 is properly received by earbud 110-2, packet 621, which is an ACK, is transmitted. In this example, packet 620 would not include a request for audio data for the audio channel of earbud 110-1 because at least one packet was properly received within CIS event 601 by earbud 110-1. Alternatively, first earbud 110-1 may blindly send the audio data for the audio channel of second earbud 110-2 to second earbud 110-2.

In an alternate embodiment, following CIS event 601 and within the CIG interval, second earbud 110-2 may transmit a request packet to earbud 110-1. In response, earbud 110-1 can transmit the audio data for the second earbud's channel to earbud 110-2 in a packet. In response to properly receiving, an ACK may be transmitted back to earbud 110-1. (If a NAK was transmitted instead, at least one retransmission within the CIG interval may be attempted.)

More specifically, in the handshake arrangements detailed herein, on the link between earbuds 110, one bud would be a central device and another would be a peripheral device. The central device initiates communication on the link and the peripheral can then follow up on that communication. In this arrangement, the peripheral cannot initiate communication. In such arrangements, whichever earbud is serving as the peripheral must be queried by the other earbud to determine whether the peripheral earbud requires its audio data. Therefore, if second earbud 110-2 is in the peripheral role, first earbud 110-1 would have to initiate the communication and then query second earbud 110-2 as part of the handshake process. Alternatively, if second earbud 110-2 is in the central device role, second earbud 110-2 would initiate the communication and query first earbud 110-1 as part of the handshake process.

FIG. 6C illustrates an embodiment 600C of communications between an audio source and true wireless earbuds using a single CIS event within a CIG interval, as in FIG. 6A. In embodiment 600C, second earbud 110-2 properly receives a transmission of the audio data of audio packet 610, but earbud 110-1 fails to receive every transmission during CIS event 601. From the perspective of audio source 120, audio packets are being sent via Bluetooth LE to a single audio output device. As detailed in relation to FIG. 5, within a CIG interval, a single CIS event is used to transmit audio data for two audio channels (e.g., left and right). Such an arrangement may not require any special configuration on the audio source device, since using a single CIS event in a CIG interval with audio data for both channels can be a standard Bluetooth LE configuration. Again here, earbud 110-1 is functioning as the leader earbud and earbud 110-2 is functioning as the hidden earbud.

Embodiment 600C proceeds generally in accordance with embodiment 600A. In this example, both earbuds 110 failed to receive audio packet 610. In response, earbud 110-1 sends NAK 611 (which would have been a NAK even if audio packet 610 was properly received).

A key difference to embodiment 600C is that first earbud 110-1 failed to receive each transmission of the audio data of audio packet 610. Therefore, following CIS event 601, first earbud 110-1 has not received the audio data, but earbud 110-2 has receive the audio data for both audio channels in successfully received audio packet 612.

Following CIS event 601 and within the same CIG interval, earbud 110-1 sends request packet 620 for the audio channel of first earbud 110-1 using a separate Bluetooth LE communication link between earbuds 110 (or via a proprietary link). In response, second earbud 110-2 transmits audio packet 621 which includes the audio data for the audio channel to be output by earbud 110-1. Following successful receipt, ACK 623 can be transmitted to earbud 110-2. (If a NAK was transmitted instead, at least one retransmission within the CIG interval may be attempted.)

Continuing to refer to embodiment 600C, in an alternative embodiment, ACK 617 may be a NAK in response to earbud 110-1 failing to receive all packets during CIS event 601. If a maximum number of retries, as stored by audio source 120, has not yet been reached, audio source 120 may retransmit the audio data of audio packet 610 during a next CIS event in the next CIG interval. In response, whether received properly or not, earbud 110-1 may transmit an ACK because the audio data was successfully retrieved from earbud 110-2. If the audio data was not properly retrieved from second earbud 110-2, earbud 110-1 may send NAKs until the audio data is properly received or audio source 120 reaches a maximum number of retries and transitions to transmitting a next audio packet.

In a variation on the embodiments presented in relation to FIGS. 6A-6C, in some embodiments, an airtime bandwidth optimization can be performed by earbuds 110. An airtime bandwidth optimization allows for earbuds 110 to adjust to link conditions between earbuds 110 and audio source 120 and also to link conditions between earbud 110-1 and earbud 110-2. In general, first earbud 110-1 determines that the link quality between earbuds 110 is relatively poor (but the link quality between at least earbud 110-2 and audio source 120 is relatively good), first earbud 110-1 may increase the number of NAKs transmitted to audio source 120 despite first earbud 110-1 having properly received an audio packet.

This arrangement may be beneficial because second earbud 110-2 is more likely to successfully receive an audio packet transmitted by audio source 120 than audio data relayed by earbud 110-1.

As another possible scenario, if first earbud 110-1 determines that the link quality between earbuds 110 is relatively good, but the link quality between earbud 110-1 or earbud 110-2 and audio source 120 is relatively bad, first earbud 110-1 may decrease a number of NAKs transmitted to audio source 120 when first earbud 110-1 has properly received an audio packet or may immediately transmit an ACK when the audio packet is successfully received by first earbud 110-1. This arrangement may be beneficial because the earbuds are more likely to successfully receive audio data relayed by the other earbud than audio source 120.

These airtime bandwidth optimizations can help decrease the total number of retransmissions of audio data, thus saving airtime and, possibly, battery power (e.g., of audio source 120 and/or of earbuds 110). In order to assess link quality, a measured signal strength may be used, such as for comparison to a stored signal strength (e.g., a value for the cross-earbud link, a second value for the link from audio source 120 to earbuds 110). Alternatively, the number of times that first earbud 110-1 needs to relay audio to second earbud 110-2, the number of times that second earbud 110-2 needs to relay audio to first earbud 110-1, and the number of missed packets from audio source 120 by each earbud may be tracked over a rolling window of time to determine whether the link between audio source 120 and each of earbuds 110 is stronger or weaker relative to the link between earbuds. These values can then be compared (e.g., to each other, to stored threshold values) to determine the adaptive scheme that should be used to optimize bandwidth.

In alternate embodiments, no communication is performed directly between earbuds to exchange audio data. Rather, each earbud is reliant on receiving the audio directly from audio source 120. FIG. 6D illustrates an embodiment 600D of communications between an audio source and true wireless earbuds using a single CIS event within a CIG interval. From the perspective of audio source 120, audio packets are being sent via Bluetooth LE to a single audio output device. As detailed in relation to FIG. 5, within a CIG interval, a single CIS event is used to transmit audio data for two audio channels (e.g., left and right). Such an arrangement may not require any special configuration on the audio source device, since using a single CIS event in a CIG interval with audio data for both channels can be a standard Bluetooth LE configuration.

Embodiment 600D proceeds as detailed in relation to embodiment 600A except there is no cross-earbud communication following completion of CIS event 601. Such an arrangement may be particularly beneficial for low-latency applications, such as video conferencing, gaming, audio conferencing, and phone calls. Further, the arrangement of embodiment 600D reserves more airtime within the CIG interval for other Bluetooth communications.

While the embodiments of FIGS. 6A-6F do not use a CrossACK message between earbuds during CIS events, the embodiments of FIGS. 7A-7D use CrossACK messages transmitted directly between earbuds. These short messages allow for one earbud to inform the other earbud that audio data has been properly received. Therefore, the use of CrossACK messages can be used to decrease the number of retransmissions requested from an audio source and increase the likelihood that each packet is properly received by each earbud.

Figure 7A:
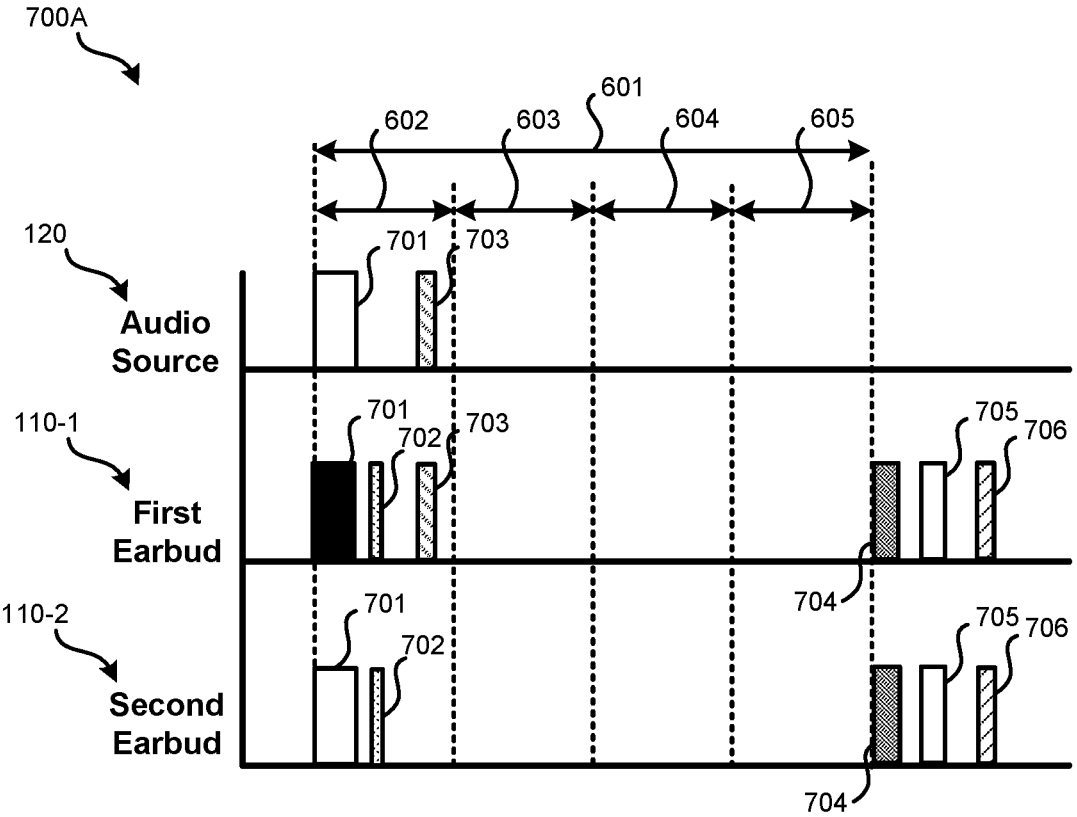
FIG. 7A illustrates an embodiment of communications between an audio source and earbuds using a single joint CIS event within a CIG interval using a cross acknowledgement.

FIG. 7A illustrates an embodiment 700A of communications between an audio source and earbuds using a single joint CIS event within a CIG interval using a cross acknowledgement. Method 700D of FIG. 7D is described concurrently with embodiment 700A. Method 700D is performed using true wireless earbuds as detailed in relation to FIG. 1. At some point prior to the transmission of audio packet 701, earbuds 110 can exchange information in order to successfully receive the packets addressed exclusively for the other earbud on a CIS meant for the other earbud (e.g. CIS timing information, CIS properties like physical layer used, encryption keys, etc.) at block 750. In the embodiments of FIGS. 7A-7D, audio packets are addressed to only first earbud 110-1, with second earbud 110-2 using the exchanged information to sniff the audio packets.

Audio source 120 can transmit audio packet 701 at block 752. Audio packet 701 is a joint CIS audio packet and is addressed only to first earbud 110-1. From the perspective of audio source 120, audio source 120 is sending both audio output channels to only first earbud 110-1. Accordingly, within a CIG interval, only a single audio CIS event 601 occurs for earbuds 110.

In the example illustrated, first earbud 110-1 fails to properly receive audio packet 701 at block 754. However, second earbud 110-2 is able to successfully sniff audio packet 701, which is addressed to only earbud 110-1, at block 756. In response, second earbud 110-2 transmits CrossACK 702 to first earbud 110-1 at block 758. CrossACK 702 indicates that the audio packet has been successfully received. CrossACK 702 is transmitted after audio packet 701, but before first earbud 110-1 needs to respond to audio source 120 with either an ACK or a NAK.

While first earbud 110-1 did not properly receive audio packet 701, because it did receive CrossACK 702, first earbud 110-1 send ACK 703 to audio source 120 at block 760. In response to ACK 703, audio source 120 does not retransmit the audio data of audio packet 701. Therefore, following subevent 602, second earbud 110-2 has receive audio data for both audio channels while first earbud 110-1 has not successfully received any audio data during CIS event 601.

In some embodiments, the remaining subevents within CIS event 601 remain empty due to ACK 703 being received by audio source 120. After CIS event 601 and within a same CIG interval, communication can occur between first earbud 110-1 and second earbud 110-2. In a handshake arrangement, on a communication link between earbuds 110, one earbud would be a central device and the other earbud would be a peripheral device. The central device initiates communication on the link and the peripheral can then follow up on that communication. In this arrangement, the peripheral cannot initiate communication. In such arrangements, whichever earbud is serving as the peripheral must be queried by the other earbud to determine whether the peripheral earbud requires its audio data. Therefore, if second earbud 110-2 is in the peripheral role, first earbud 110-1 would have to initiate the communication and then query second earbud 110-2 as part of the handshake process. Alternatively, if second earbud 110-2 is in the central device role, second earbud 110-2 would initiate the communication and query first earbud 110-1 as part of the handshake process.

In the illustrated embodiment, first earbud 110-1 is functioning as the central earbud and second earbud 110-2 is functioning as the peripheral. As such, first earbud 110-1 sends request message 704 to second earbud 110-2 within the CIG interval of CIS event 601. In response to the request, second earbud 110-2 transmits audio data as audio packet 705 from audio packet 701 to first earbud 110-1 at block 762. The audio data may include only audio data corresponding to the audio channel to be output by first earbud 110-1. That is, audio data corresponding to the audio channel to be output by second earbud 110-2 is not relayed to first earbud 110-1. In some embodiments, in response to receiving audio packet 705, earbud 110-1 transmits ACK as packet 706 to second earbud 110-2 at block 764. If ACK transmitted as packet 706 is not received by earbud 110-2, at least one additional attempt at transmitting the audio data to first earbud 110-1 may be attempted.

In an alternative embodiment, data may be relayed between earbuds during CIS event 601. Since an ACK was transmitted in subevent 602, earbuds 110 can expect no communications with audio source 120 during subevents 603, 604, and 605. Instead, the earbuds may perform communication between each other during one or more of these unused subevents. For example, in some embodiments, an ACK is always transmitted by first earbud 110-1 to audio source 120 by at least subevent 604 such that the time of subevent 605 is kept available for cross-communication among earbuds 110. In another arrangement, an ACK is always transmitted by first earbud 110-1 to audio source 120 by at least subevent 603 such that the time of subevent 604 and subevent 605 is kept available for cross-communication among earbuds 110.

At block 766 first earbud 110-1 outputs audio via its speaker based on the audio data received from the second earbud for its corresponding audio channel. At block 768, second earbud 110-2 outputs audio via its speaker based on the audio data for its corresponding audio channel.

Figure 7B:
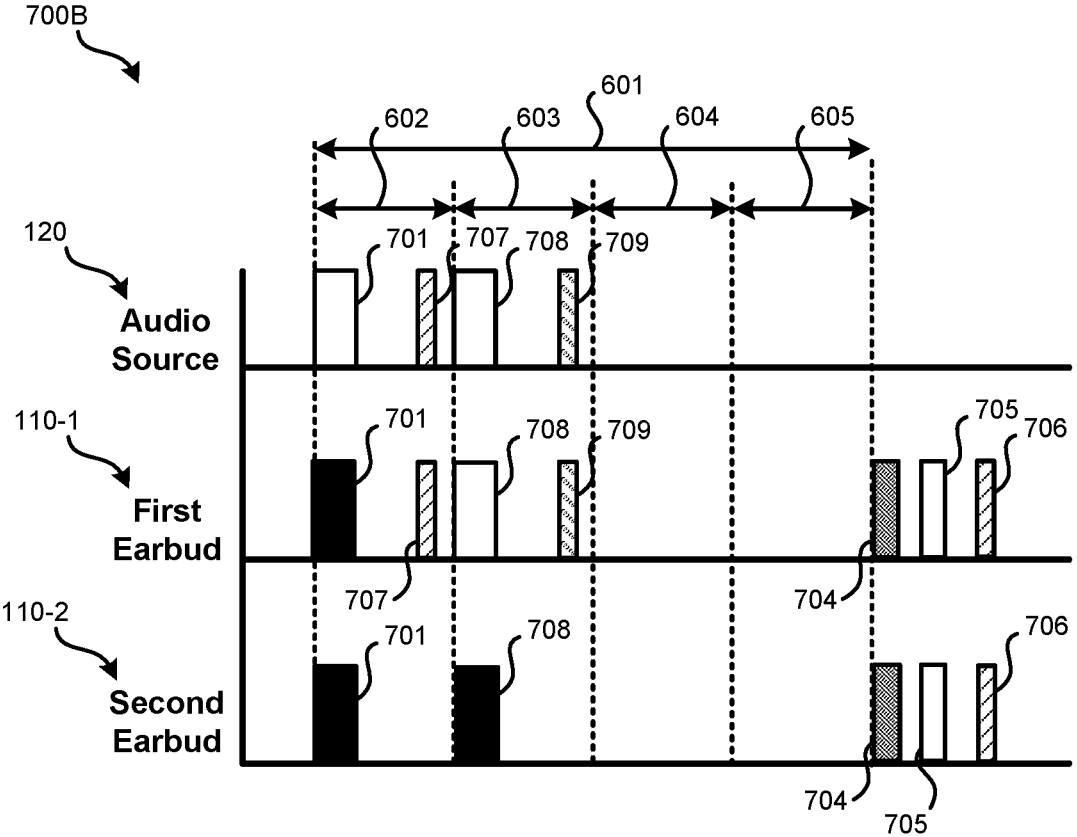
FIG. 7B illustrates an embodiment of communications between an audio source and earbuds using a single joint CIS event within a CIG interval in which a cross acknowledgement is not received.

FIG. 7B illustrates an embodiment 700B of communications between an audio source and earbuds using a single joint CIS event within a CIG interval in which a cross acknowledgement is not received. At some point prior to the transmission of audio packet 701, earbuds 110 can exchange information in order to successfully receive the packets addressed exclusively for the other earbud on a CIS meant for the other earbud (e.g. CIS timing information, CIS properties like physical layer used, encryption keys, etc.).

Audio source 120 can transmit audio packet 701. Audio packet 701 is a joint CIS audio packet and is addressed only to first earbud 110-1. From the perspective of audio source 120, audio source 120 is sending both audio output channels to only first earbud 110-1. Accordingly, within a CIG interval, only a single audio CIS event 601 occurs for earbuds 110.

In the example illustrated, first earbud 110-1 and second earbud 110-2 fails to properly receive audio packet 701. As such, no CrossACK is transmitted from second earbud 110-2 to first earbud 110-1.

Since first earbud 110-1 did not properly receive audio packet 701 and because it did not receive CrossACK 702, first earbud 110-1 send NAK 707 to audio source 120. In response to NAK 707, audio source 120 retransmits the audio data of audio packet 701 as audio packet 708 in subevent 603. In subevent 603, first earbud 110-1 properly receives audio packet 708 and, as such, transmits ACK 709, which prevents audio source 120 from sending any additional retransmissions.

In the illustrated embodiment, first earbud 110-1 is functioning as the central earbud and second earbud 110-2 is functioning as the peripheral. As such, first earbud 110-1 sends message packet 704 to second earbud 110-2 within the CIG interval corresponding to CIS event 601. Since a CrossACK was not received by first earbud 110-1 from second earbud 110-2, message packet 704 can include the audio data corresponding to only the audio channel to be output by second earbud 110-2. In response, second earbud 110-2 may transmit an ACK as packet 705.

In a variation, packet 704 can act as a query as to whether second earbud 110-2 needs the audio data from audio packet 701. In response, packet 705 can indicate whether the audio data is needed. If indicated as needed, first earbud 110-1 can transmit packet 706 that includes audio data from audio packet 701, which may include only the audio data for the audio channel being output by second earbud 110-2 (e.g., the left channel or the right channel).

As detailed in relation to FIG. 7A, in a variation on embodiment 700B, one or more subevents may be reserved within CIS event 601 to allow for communication between earbuds without requiring the use of airtime within the CIG interval outside of CIS event 601.

Figure 7C:
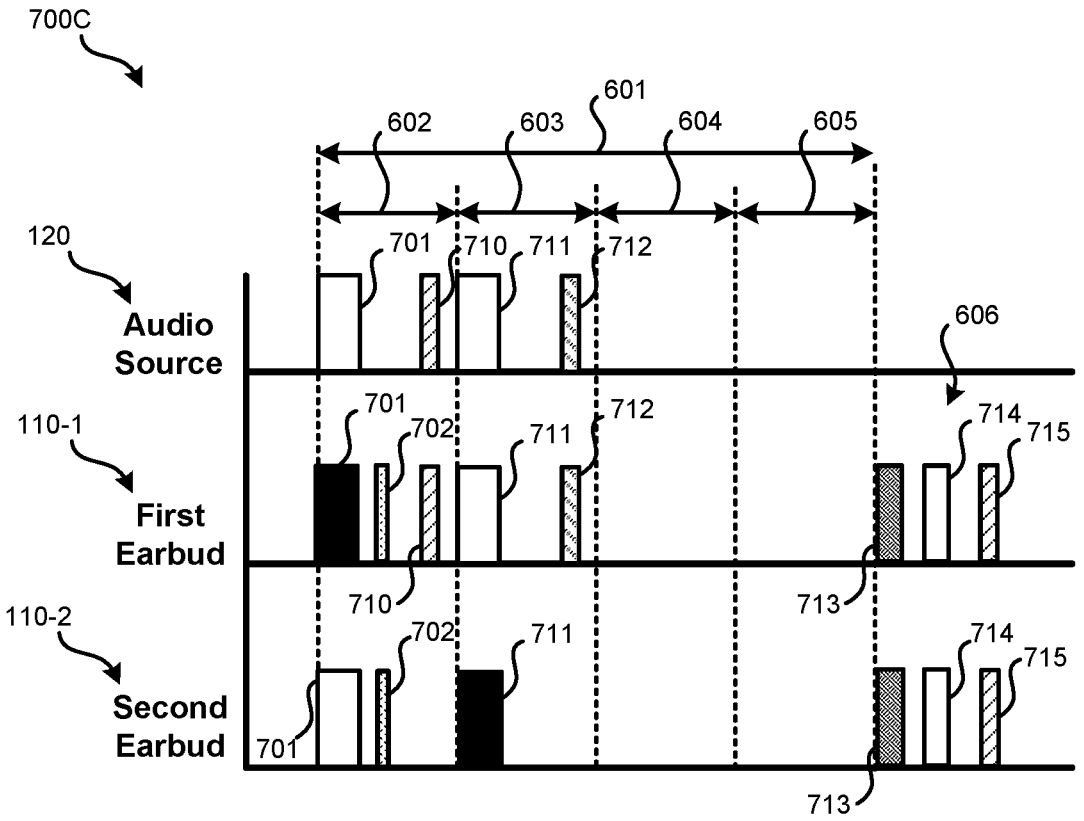
FIG. 7C illustrates another embodiment of communications between an audio source and earbuds using a single joint CIS event within a CIG interval using a cross acknowledgement.

In some embodiments, even if a CrossACK is received from the second earbud, the first earbud may send up to a predefined number of NAKs in an attempt to receive an audio packet directly from the audio source, rather than needing the audio data to be relayed from the second earbud. FIG. 7C illustrates another embodiment 700C of communications between an audio source and earbuds using a single joint CIS event within a CIG interval using a cross acknowledgement. At some point prior to the transmission of audio packet 701, earbuds 110 can exchange information in order to successfully receive the packets addressed exclusively for the other earbud on a CIS meant for the other earbud (e.g. CIS timing information, CIS properties like physical layer used, encryption keys, etc.).

Audio source 120 can transmit audio packet 701. Audio packet 701 is a joint CIS audio packet and is addressed only to first earbud 110-1. From the perspective of audio source 120, audio source 120 is sending both audio output channels to only first earbud 110-1. Accordingly, within a CIG interval, only a single audio CIS event 601 occurs for earbuds 110.

In the example illustrated, first earbud 110-1 fails to properly receive audio packet 701 at block 754. However, second earbud 110-2 is able to successfully sniff audio packet 701, which is addressed to only earbud 110-1. In response, second earbud 110-2 transmits CrossACK 702 to first earbud 110-1. CrossACK 702 indicates that the audio packet has been successfully received. CrossACK 702 is transmitted after audio packet 701, but before first earbud 110-1 needs to respond to audio source 120 with either an ACK or a NAK.

Despite receiving CrossACK 702, in these embodiments, first earbud 110-1 send NAK 710 to audio source 120. Rather than requesting the missed audio data from earbud 110-2, first earbud 110-1 response with NAK 710 to cause audio source 120 to retransmit the audio data of audio packet 701. In response to NAK 710, audio source 120 does retransmits the audio data of audio packet 701 as audio packet 711.

In the illustrated embodiment, earbud 110-1 successfully receives audio packet 711. As illustrated, earbud 110-2 did not properly receive audio packet 711, but this is inconsequential since earbud 110-2 properly received audio packet 701. (In some embodiments, earbud 110-2 may not attempt to receive audio packet 711 since audio packet 701 was properly received within CIS event 601.) ACK 712 is transmitted to audio source 120 in response to earbud 110-1 properly receiving audio packet 711. Since both earbuds properly received the audio packet, no relay of audio data between earbuds 110 is needed for CIS event 601.

However, in an alternate arrangement, earbud 110-1 may fail some additional number of times to receive the audio data of audio packet 701. Despite CrossACK 702 having been received, earbud 110-1 may transmit up to a predefined number of NAKs within CIS event 601 or spanning multiple CIS events before relying on second earbud 110-2 to relay the missed audio data. As an example, earbud 110-1 may transmit at least two NAKs, thus using three subevents (602, 603, and 604) to attempt to receive the audio data directly from audio source 120. If the audio data fails to be received by earbud 110-1, relay between earbuds may be performed on a separate communication link during a subevent (e.g., subevent 605) or outside of CIS event 601 (but within the CIG interval), such as indicated by packet 713, packet 714, and packet 715.

As previously detailed, on a separate link between earbuds 110, one bud would be a central device and another would be a peripheral device. For example, earbud 110-1 could request the audio data using packet 713. Earbud 110-2 may respond with audio packet 714, which may include only the audio needed for the audio channel to be output by earbud 110-1. When received, earbud may response with an ACK as packet 715.

It should also be noted that earbuds 110 can function in multiple modes. In a first mode, earbuds 110 may function as detailed in relation to any of the embodiments of FIGS. 6A-7D. In a second mode, earbuds 110 may function in a mode that relies on conventional Bluetooth communication. Earbuds 110 may be able to switch between modes, such as in response to user input or a determination by earbuds 110.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known, processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A pair of true wireless earbuds, comprising:

a first earbud, comprising a first speaker, a first processing system, and a first wireless communication interface, that communicates with an audio source device using short-range wireless communications; and a second earbud, comprising a second speaker, a second processing system, and a second wireless communication interface, that communicates with the audio source device using short-range wireless communications, wherein:

the second earbud is not physically connected with the first earbud;

the second earbud is configured to:

receive an audio packet addressed to only the first earbud, wherein a single connected isochronous stream (CIS) within a connected isochronous group (CIG) is present between the pair of true wireless earbuds and the audio source device;

transmit a cross-acknowledgement indicating receipt of the audio packet to the first earbud; and transmit extracted audio data from the audio packet to the first earbud;

the first earbud is configured to:

determine that the audio packet expected from the audio source device was not successfully received by the first earbud;

receive the cross-acknowledgement from the second earbud; and transmit an acknowledgement to the audio source device based on the cross-acknowledgement despite the first earbud determining that the audio packet expected from the audio source device was not successfully received by the first earbud.

2. The pair of true wireless earbuds of claim 1, wherein the first processing system of the first earbud is configured to:

transmit a request directly to the second earbud for the audio data from the audio packet, wherein the second earbud transmits the audio data in response to the request.

3. The pair of true wireless earbuds of claim 2, wherein the request is transmitted after a CIS event in which the audio source device transmitted the audio packet and during a CIG interval in which the CIS event occurred.

4. The pair of true wireless earbuds of claim 1, wherein the audio packet includes audio data to be output by the first earbud and the second earbud.

5. The pair of true wireless earbuds of claim 1, wherein the audio data transmitted by the second earbud to the first earbud includes audio data corresponding to only an audio channel to be output by the first earbud.

6. The pair of true wireless earbuds of claim 1, wherein:

the audio packet includes audio data for a first audio channel associated with the first earbud and audio data for a second audio channel associated with the second earbud; and the second processing system of the second earbud is configured to:

store encryption credentials for the first earbud;

decrypt the audio packet addressed to only the first earbud using the stored encryption credentials; and causes the second speaker to output audio based on decrypted audio data from the audio packet, wherein the audio output by the second speaker is based on the audio data for the second audio channel associated with the second earbud.

7. The pair of true wireless earbuds of claim 1, wherein the first earbud and the audio source device communicate using Bluetooth Low Energy (LE).

8. A method for short-range wireless communication, the method comprising:

receiving, by a second earbud of a pair of true wireless earbuds, an audio packet addressed to only a first earbud of the pair of true wireless earbuds, wherein a single connected isochronous stream (CIS) within a connected isochronous group (CIG) is present between the pair of true wireless earbuds and an audio source which transmitted the audio packet;

transmitting, by the second earbud to the first earbud, a cross-acknowledgement indicating receipt of the audio packet; and transmitting, by the second earbud to the first earbud, extracted audio data from the audio packet;

determining, by the first earbud, that the audio packet expected from the audio source device was not successfully received by the first earbud;

receiving, by the first earbud, the cross-acknowledgement from the second earbud; and transmitting, by the first earbud, an acknowledgement to the audio source device based on the cross-acknowledgement despite the first earbud determining that the audio packet expected from the audio source device was not successfully received by the first earbud.

9. The method for short-range wireless communication of claim 8, wherein:

the audio packet includes audio data for a first audio channel associated with the first earbud and audio data for a second audio channel associated with the second earbud; and the audio data transmitted to the first earbud by the second earbud includes only audio data for the first audio channel.

10. The method for short-range wireless communication of claim 8, further comprising:

transmitting, by the first earbud, a request directly to the second earbud for audio data from the audio packet, wherein the second earbud transmits the audio data for the first audio channel directly to the first earbud in response to the request.

11. The method for short-range wireless communication of claim 10, wherein the request is transmitted after a CIS event in which the audio source transmitted the audio packet and during a CIG interval in which the CIS event occurred.

12. The method for short-range wireless communication of claim 10, further comprising:

outputting, by the first earbud via a first speaker, audio based on the audio data for the first audio channel; and

outputting, by the second earbud via a second speaker, audio based on the audio data for the second audio channel.

13. The method for short-range wireless communication of claim 8, further comprising:

storing, by the second earbud, encryption credentials for the first earbud; and decrypting, by the second earbud, the audio packet addressed to only the first earbud using the stored encryption credentials.

14. The method for short-range wireless communication of claim 8, wherein the first earbud and the audio source communicate using Bluetooth Low Energy (LE).

15. One or more non-transitory processor-readable media, comprising processor-readable instructions:

wherein when the processor-readable instructions are executed by a processor, the processor readable instructions are configured to cause a second earbud of the pair of true wireless earbuds to:

receive an audio packet addressed to only a first earbud of the pair of true wireless earbuds, wherein a single connected isochronous stream (CIS) within a connected isochronous group (CIG) is present between the pair of true wireless earbuds and an audio source which transmitted the audio packet;

cause a cross-acknowledgement indicating receipt of the audio packet to be transmitted to the first earbud; and cause extracted audio data from the audio packet to be transmitted to the first earbud; and wherein the processor readable instructions are configured to cause the first earbud of the pair of true wireless earbuds to:

determine that the audio packet expected from the audio source device was not successfully received by the first earbud;

receive the cross-acknowledgement from the second earbud; and transmit an acknowledgement to the audio source device based on the cross-acknowledgement despite the first earbud determining that the audio packet was not successfully received by the first earbud.

\* \* \* \* \*